(12) United States Patent
Choi et al.

(10) Patent No.: US 11,297,464 B2
(45) Date of Patent: Apr. 5, 2022

(54) METHOD FOR JIGGLING COMPENSATION DURING OBJECT RECOGNITION AND ELECTRONIC DEVICE THEREOF

(71) Applicant: Samsung Electronics Co., Ltd., Suwon-si (KR)

(72) Inventors: Junsu Choi, Suwon-si (KR); Chiho Kim, Suwon-si (KR); Hyunkee Min, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/921,147

(22) Filed: Jul. 6, 2020

(65) Prior Publication Data
US 2021/0014641 A1    Jan. 14, 2021

(30) Foreign Application Priority Data
Jul. 10, 2019    (KR) .................. 10-2019-0083330

(51) Int. Cl.
*H04W 4/02*    (2018.01)
*G01S 13/62*    (2006.01)

(52) U.S. Cl.
CPC .............. *H04W 4/026* (2013.01); *G01S 13/62* (2013.01); *H04W 4/027* (2013.01)

(58) Field of Classification Search
CPC ........ H04W 4/026; H04W 4/027; G01S 13/62
See application file for complete search history.

(56) References Cited

U.S. PATENT DOCUMENTS 10,557,933 B2    2/2020    Kishigami
2011/0057829 A1*  3/2011   Yuanzhu .................. G01S 13/34
                                                        342/28

(Continued)

FOREIGN PATENT DOCUMENTS

EP    3 492 946 A1    6/2019
JP      3113148 B2   11/2000

(Continued)

OTHER PUBLICATIONS

IEEE Standard for Information technology—Telecommunications and information exchange between systems Local and metropolitan area networks—Specific requirements. Part 11: Wireless LAN Medium Access Control (MAC) and Physical Layer (PHY) Specifications. Amendment 3: Enhancements for Very High Throughput in the 60 GHz Band. New York, NY. Dec. 28, 2012. pp. 1-628.

(Continued)

*Primary Examiner* — Ernest G Tacsik
(74) *Attorney, Agent, or Firm* — Jefferson IP Law, LLP

(57) ABSTRACT

An object recognition method and an electronic device thereof are provided. The method includes transmitting a signal to an external object, controlling a wireless communication module to receive a signal reflected from the external object, controlling the wireless communication module to obtain a channel impulse response based on the transmitted signal and the received signal, obtaining information of an orientation of the external object based on the received signal, detecting phase noise caused by a movement of the electronic device, extracting a component matching the orientation of the external object from the detected phase noise, and compensating for phase information in the channel impulse response based on the component matching the orientation of the external object.

19 Claims, 19 Drawing Sheets

(56) References Cited

U.S. PATENT DOCUMENTS

| | | | |
|---|---|---|---|
| 2011/0304498 | A1 | 12/2011 | Yanagihara et al. |
| 2016/0156424 | A1* | 6/2016 | Mirbagheri ............... G01S 1/20 375/227 |
| 2016/0187475 | A1* | 6/2016 | Horng ..................... G01S 13/52 342/21 |
| 2016/0218890 | A1* | 7/2016 | Sanderovich ..... H04L 25/03305 |
| 2017/0105659 | A1* | 4/2017 | Kiaei ................... A61B 5/1102 |
| 2017/0212210 | A1* | 7/2017 | Chen ..................... G01S 5/0226 |
| 2018/0164874 | A1* | 6/2018 | Qiu ........................... G06F 3/01 |
| 2019/0020822 | A1 | 1/2019 | Sharma et al. |
| 2019/0187275 | A1 | 6/2019 | Raj et al. |
| 2020/0073480 | A1* | 3/2020 | Hof ......................... G06F 3/017 |

FOREIGN PATENT DOCUMENTS

| | | |
|---|---|---|
| KR | 10-1116274 B1 | 3/2012 |
| KR | 10-1116275 B1 | 3/2012 |
| KR | 10-2016-0036242 A | 4/2016 |
| KR | 10-2019-0043306 A | 4/2019 |

OTHER PUBLICATIONS

IEEE Standard for Information technology—Telecommunications and information exchange between systems Local and metropolitan area networks—Specific requirements. Part 11: Wireless LAN Medium Access Control (MAC) and Physical Layer (PHY) Specifications. Amendment 5: Enhancements for Higher Throughput. New York, NY. Oct. 29, 2009. pp. 1-536.

IEEE P802.11ac TM/D5.0. Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 4: Enhancements for Very High Throughput for Operation in Bands below 6 GHz. New York, NY. Jan. 2013. pp. 1-440.

IEEE P802.11ax TM/D2.2 Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 6: Enhancements for High Efficiency WLAN. New York, NY. Feb. 2018. pp. 1-620.

P802.11ay TM/D2.1. Draft Standard for Information technology—Telecommunications and information exchange Between Systems—Local and metropolitan area Networks—Specific requirements Part 11: Wireless LAN Medium Access Control (MAC) and Physical Layer (PHY) Specifications. Amendment 7: Enhancements throughput for operation in license-exempt bands above 45 GHz. New York, NY. Oct. 2018. pp. 1-679.

International Search Report and written opinion dated Nov. 3, 2020 in International Application No. PCT/KR2020/009140.

* cited by examiner

| STF (311) | CEF (313) | Header (315) | Data (317) | AGC (319) | TRN (321) |

| L-STF (351) | L-CEF (353) | L-Header (355) | EDMG-Header-A (363) | EDMG-STF (365) | EDMG-CEF (367) | EDMG-Header-B (369) | Data (357) | AGC (359) | TRN (361) |

METHOD FOR JIGGLING COMPENSATION DURING OBJECT RECOGNITION AND ELECTRONIC DEVICE THEREOF

CROSS-REFERENCE TO RELATED APPLICATION(S)

This application is based on and claims priority under 35 U.S.C. § 119(a) of a Korean patent application number 10-2019-0083330, filed on Jul. 10, 2019, in the Korean Intellectual Property Office, the disclosure of which is incorporated by reference herein in its entirety.

BACKGROUND

1. Field

The disclosure relates to an object recognition method through jiggling compensation and an electronic device thereof

2. Description of Related Art

As handphones and smart phones are commonly used, demands are increasing to authenticate a user's face to enhance security of the smartphone, or to recognize an object or a person in vicinity to perform various applications. In response to such demands, various methods for recognizing an object using a camera of the smartphone have been suggested.

The method for recognizing the object using the camera requires a complex signal processing algorithm to determine whether an image captured by the camera includes an object to recognize, and has difficulty in determining liveness. If recognizing an object using the camera, it is not easy to determine a distance to the object and thus another device (e.g., a depth camera) may be used.

A radar, which is a device for conducting a task such as object recognition, or determining a distance, an altitude, a movement direction, a movement speed, an identification, or a classification using a reflected wave or a scattered wave from an object, generally uses a microwave frequency band (e.g., about 300 megahertz (MHz) through 40 gigahertz (GHz)). For example, a radar for detecting an object near a front corner or a rear corner of a vehicle or for detecting an object at the front from a middle or long distance uses a frequency band of 24 GHz or 77 GHz.

The smartphone may perform wireless data communication using 2.4 GHz or 5 GHz band in an 802.11n or 802.11ac system. As a wireless data communication system for providing a higher data rate, an 802.11ad, 802.11aj, or 802.11ay system which has been standardized recently or is being standardized by the institute of electrical and electronics engineers (IEEE) may use a wide bandwidth of several GHz using the frequency band 40 GHz through 60 GHz. For example, the 802.11ad or 802.11aj system may support a single bandwidth of 2.16 GHz, and the 802.11ay standard which enhances from 802.11ad standard may use a much wider bandwidth, e.g., up to 8.64 GHz.

By use of the wide bandwidth of several GHz, the 802.11ay system may achieve a data rate up to 100 gigabits per second (Gbps). The wide bandwidth may acquire the high data rate in proportion to the bandwidth in the wireless data communication, and achieve high precision in proportion to the bandwidth if the 802.11ay system is used for the radar function such as object recognition, or determining a distance, an altitude, a movement direction, a movement speed, an identification, or a classification. Hence, the 802.11ay system may be applied to a radio function application scenario requiring high precision, such as face recognition, gesture recognition, or proximity object detection.

The above information is presented as background information only to assist with an understanding of the disclosure. No determination has been made, and no assertion is made, as to whether any of the above might be applicable as prior art with regard to the disclosure.

SUMMARY

If a person holding a terminal for transmitting or receiving a signal of a wireless communication system such as 802.11ay performs a task such as face recognition or gesture recognition by transmitting or receiving the signal of the wireless communication system, the terminal may continuously experience a slight location change due to micro movement of a human body, such as hand shaking Such a slight location change can cause a phase variation in a radar function which performs distance measurement and face recognition or gesture recognition based on the phase variation. This phase variation serves as noise and may cause a problem such as recognition degradation in the radar function.

Aspects of the disclosure are to address at least the above-mentioned problems and/or disadvantages and to provide at least the advantages described below. Accordingly, an aspect of the disclosure is to provide a method for providing high precision and recognition, if a device for wireless communication in an electronic device is used as a radar function by mitigating phase noise caused by movement of a person or movement or vibration in an installation environment.

Another aspect of the disclosure is to provide a method for providing high precision and recognition, by detecting a location change of an electronic device using a device such as a sensor (e.g., an acceleration sensor or a gyro sensor) in the electronic device, obtaining and compensating for phase noise, and mitigating phase noise caused by hand shaking, vibration, or movement.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module, a movement detection module configured to detect a movement of the electronic device, at least one processor operatively coupled with the wireless communication module and the movement detection module, and at least one memory operatively coupled with the at least one processor. The at least one memory stores instructions which, when executed, cause the at least one processor to control the wireless communication module to transmit a signal to an external object, control the wireless communication module to receive a signal reflected from the external object, obtain a channel impulse response based on the transmitted signal and the received signal, obtain information of an orientation of the external object based on the received signal, detect phase noise caused by a movement of the electronic device, controlling the movement detection module to extract a component matching the orientation of the external object from the detected phase noise, and compensate for phase information in the channel impulse response based on the component matching the orientation of the external object.

In accordance with another aspect of the disclosure, an electronic device is provided. The electronic device includes a wireless communication module, a movement detection module configured to detect a movement of the electronic device, and at least one processor operatively coupled with the wireless communication module and the movement detection module. The wireless communication module is configured to transmit a signal to an external object, receive a signal reflected from the external object, obtain a channel impulse response based on the transmitted signal and the received signal, obtain information of an orientation of the external object based on the received signal, receive a detected phase noise from the movement detection module, extract a component matching an orientation of the external object from the detected phase noise, and compensate for phase information in the channel impulse response based on the component matching the orientation of the external object. The movement detection module is configured to obtain first location information of the electronic device at a reference time, second location information of the electronic device in transmitting the signal or receiving the reflected signal, and location change information indicating a difference between the reference time and a location of the signal transmission or the reflected signal reception based on the second location information and the first location information, extract a component matching the orientation of the external object from the location change information, and detect the phase noise based on the extracted component of the location change information matching the orientation of the external object.

In accordance with another aspect of the disclosure, a method for operating an electronic device is provided. The method includes controlling a wireless communication module to transmit a signal to an external object, controlling the wireless communication module to receive a signal reflected from the external object, obtaining a channel impulse response based on the transmitted signal and the received signal, obtaining information of an orientation of the external object based on the received signal, detecting phase noise caused by a movement of the electronic device, extracting a component matching the orientation of the external object from the detected phase noise, and compensating for phase information in the channel impulse response based on the component matching the orientation of the external object.

Technical objectives of the disclosure are not limited to the above-mentioned technical objectives, and other technical objectives which are not mentioned may be clearly understood by those skilled in the technical field of the disclosure through the following descriptions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A is a diagram illustrating a physical layer protocol data unit (PPDU) structure used in an 802.11ad system according to an embodiment of the disclosure;

FIG. 3B is a diagram illustrating a PPDU structure used in an 802.11ay system according to an embodiment of the disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
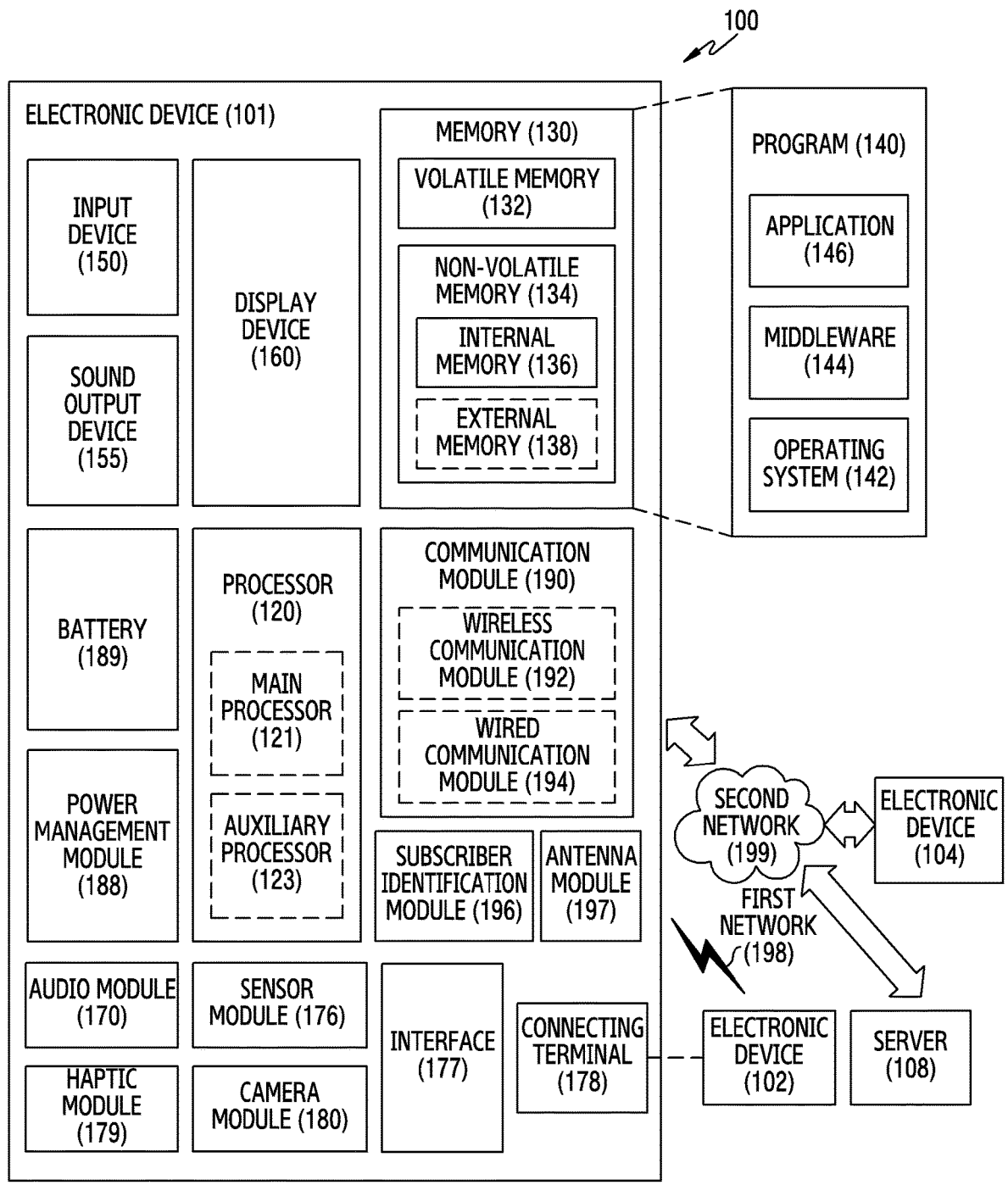
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
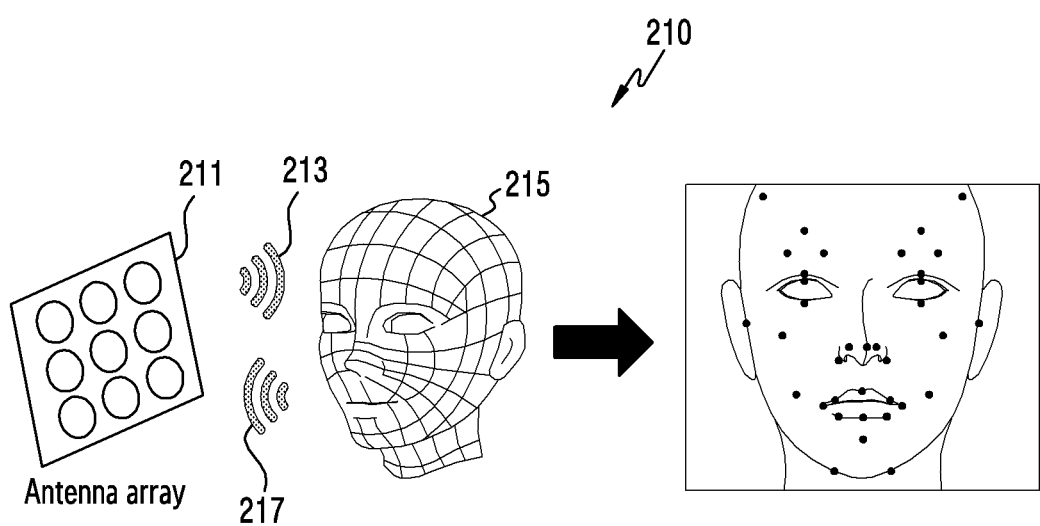
FIG. 2A is a diagram illustrating an embodiment of the disclosure.
Figure 2B:
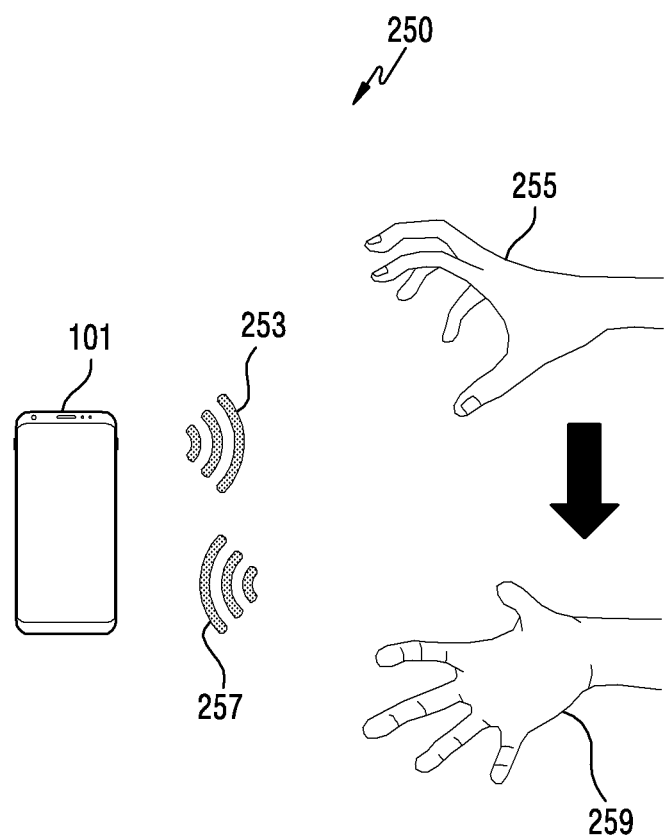
FIG. 2B is a diagram illustrating an embodiment of the disclosure.

FIG. 2A and FIG. 2B are diagrams illustrating embodiments 210 and 250 of the disclosure.

Referring to FIG. 2A, an electronic device (e.g., the electronic device 101 of FIG. 1) may transmit a signal 213 of a wireless communication system via an antenna array 211 of the electronic device, and recognize a face 215 of a person in vicinity based on a reflected signal 217 which is reflected from the face 215 of the person in vicinity. In so doing, the electronic device may transmit a plurality of signals 213 and distinguish and classify (e.g., user authentication) a person as well as presence or absence based no phase information of the reflected signal 217. According to an embodiment, at least part of the antenna array 211 may transmit the signal 213, and at least another part may receive the reflected signal 217.

Referring to FIG. 2B, the electronic device (e.g., the electronic device 101 of FIG. 1) may transmit a signal 253 of the wireless communication system for multiple times, and recognize that a hand manipulation or a hand is changed from a first form 255 and a second form 259 based on a reflected signal 257 which is reflected from the hand in the first form 255 or in the second form 259. The electronic device may transmit the signal 253 of the wireless communication system for multiple times and recognize the hand manipulation or gesture change based on phase information of the reflected signal 257 and phase variation information per receive signal.

The wireless communication system used in the embodiment of FIG. 2A or FIG. 2B may employ 802.11n or 802.11ac system, and may employ 802.11ad, 802.11aj or 802.11ay system for replacing 802.11n or 802.11ac, to support a higher wireless data transmission rate.

The 802.11n or 802.11ac system may transmit a signal using 20, 40, 80 or 160 MHz bandwidth in 2.4 GHz or 5 GHz frequency band, and accordingly a resolution of distance measurement may low but a method of the disclosure may be applied.

The 802.11ad, 802.11aj or 802.11ay system may use a wide bandwidth of several GHz using the frequency band 45 GHz through 60 GHz. For example, the 802.11ad or 802.11ay system may support a single bandwidth up to 2.16 GHz, and the 802.11ay system may use a much wider bandwidth up to 8.64 GHz. Using the wide bandwidth of several GHz, the 802.1 lay system may obtain higher resolution and precision in the measurement in proportion to the bandwidth.

One or more embodiments are described based on the 802.1 lay system, but the wireless communication system of the disclosure is not limited to this system and may adopt other wireless communication system, and the disclosed method may be applied in the similar manner FIG. 3A is a diagram illustrating a structure of a physical layer protocol data unit (PPDU) 310 used in the 802.11ad system according to an embodiment of the disclosure.

FIG. 3B is a diagram illustrating a structure of a PPDU 350 used in the 802.11ay system according to an embodiment of the disclosure.

Figure 3C:
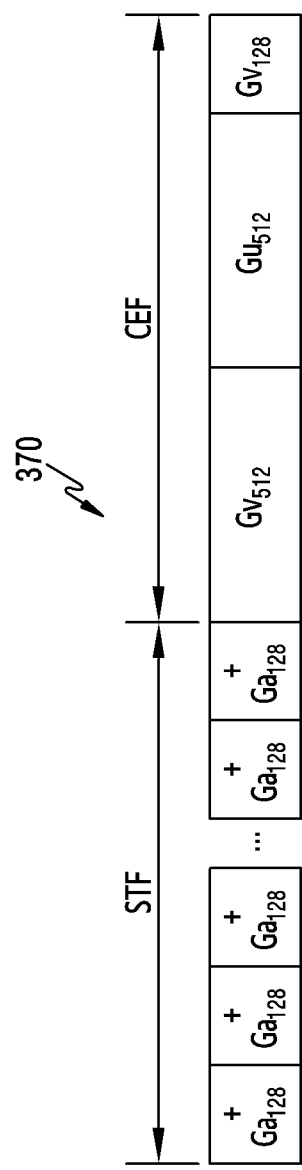
FIG. 3C is a diagram illustrating a Golay sequence structure used in a short training field (STF) and a channel estimation field (CEF) of the PPDU used in an 802.11ad system according to an embodiment of the disclosure.

FIG. 3C is a diagram illustrating a structure of a Golay sequence 370 used in a short training field (STF) 311 and a channel estimation field (CEF) 313 of the PPDU used in the 802.11ad system according to an embodiment of the disclosure.

Referring to FIG. 3A, the PPDU 310 of the 802.11ad system may include six fields of an STF 311, a CEF 313, a header field 315, a data field 317, an automatic gain control (AGC) field 319 and a receive/transmit training (TRN) field 321. The STF 311 may be used for synchronization between devices which transmit or receive a signal, the CEF 313 may be used for channel estimation, the data field 317 may include data transmitted, and the ACG field 319 and the TRN field 321 may be used for beam enhancement and beam tracking. The header field 315 may include a plurality of fields describing the transmitted PPDU 310, which may change according to a transmission format of the PPDU 310. Examples of the transmission format of the PPDU 310 may include a control physical layer, an orthogonal frequency division multiplexing (OFDM) physical layer, and a single carrier (SC) physical layer.

Referring to FIG. 3B, the PPDU 350 used in the 802.11ay system includes the fields 311, 313, or 315 of the PPDU 310 used in the 802.11ad system for the sake of backward compatibility with the 802.11ad system. To distinguish from new fields 363, 365, 367, or 369, the fields 311, 313, or 315 of the legacy 802.11ad system PPDU 310 may be prefixed with 'L' indicating the legacy and may be referred to as an L-STF 351, an L-CEF 353, or an L-header 355. In addition to the fields of the PPDU 310 of the 802.11ad system, the PPDU 350 used in the 802.11ay system may include a signaling field required to support features added to the 802.11ay system, such as channel bonding or multi input multi output (MIMO). For doing so, the PPDU 350 of the 802.11ay system may further include the enhanced directional multi-gigabit (EDMG)-Header-A 363, the EDMG-STF 365, the EDMG-CEF 367, or the EDMG-Header-B 369 between the legacy header fields 351, 353, or 355 and the data field 357 as shown in FIG. 3B. The EDMG is the term prefixed to indicate the main features of the 802.11ay. The EDMG-STF 365 and the EDMG-CEF 367 perform the similar functions to the L-STF 351 and the L-CEF 353, and the EDMG-Header-A 363 and the EDMG-Header-B 369 may include a plurality of fields describing the transmitted PPDU 350. The AGC field 359 corresponds to the AGC field 319 of FIG. 3A, and the TRN field 361 corresponds to the TRN field 321 of FIG. 3A.

The electronic device 101 may transmit the Golay sequence in the CEF 313, the L-CEF 353, or the EDMG-CEF 367 of the PPDU 310 or 350 of FIGS. 3A and 3B, and an electronic device receiving the PPDU 310 or 350 may perform channel estimation required to successfully receive data symbols transmitted in the data field 317 or 357, by use of the Golay sequence.

Referring to FIG. 3C, for example, the STF 311 may include 16 same 128-chip Golay sequence +Ga128 and one different 128-chip Golay sequence -Ga128 for the receiving device receiving the PPDU to synchronize the reception timing, and the CEF 313 may include two different 512-chip Golay sequences Gu512 and Gv512 and one 128-chip Golay sequence Gv128 for the channel estimation. Hence, the STF may have the length of 17·128=2,176 Tc, and the CEF may have the length of 1,152 Tc. Tc is a chip duration and may denote the time taken to transmit one chip.

FIG. 3C illustrates the format of the Golay sequence transmitted in the STF 311 and the CEF 313 of the 802.11ad system, which may be also applied to the L-STF 351 and the L-CEF 353 of the 802.11ay system improved from the 802.11ad system.

Figure 4:
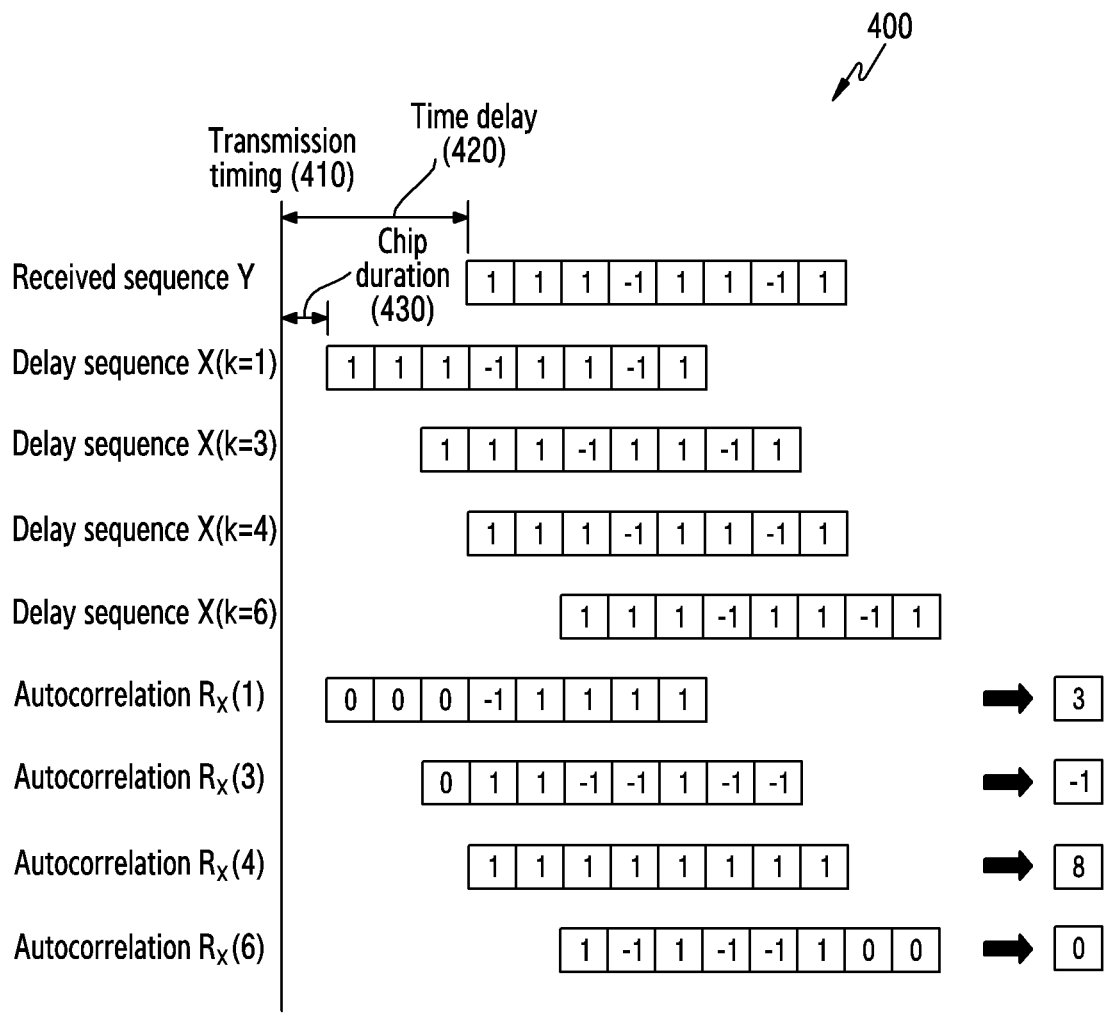
FIG. 4 is a diagram illustrating an example of autocorrelation calculation according to an embodiment the disclosure.

FIG. 4 is a diagram 400 illustrating an example of autocorrelation calculation according to an embodiment of the disclosure.

A sequence X of a particular length N (e.g., 8) may be given, the electronic device 101 may transmit a signal including the sequence X at a transmission timing 410, the transmitted signal may be reflected from an object to recognize, and the electronic device 101 may receive the reflected signal including a sequence Y. The signal received at the electronic device 101 may be delayed by a specific time delay (e.g., 4·chip duration) 420 from the transmission timing 410. A chip duration 430 may indicate a time taken to transmit one chip or one symbol, and may be inversely proportional to a bandwidth of the signal transmission. The electronic device 101 may calculate an autocorrelation $R_X(k)$ between the received sequence Y and a delay sequence X(k) which is delayed from the sequence X by the chip duration k to determine the time delay 420 experienced by the received sequence Y. The autocorrelation may be calculated by adding products of the same components of the two sequences, and may be expressed as $R_X(k)=\Sigma_{j=1}^N X_j(k)Y_j$. Y denotes the received sequence, which is the delayed signal of X by the particular time, and X(k) is the signal delayed from the sequence X by the chip duration k at the transmitting timing 410.

Referring to FIG. 4, if the autocorrelation between the sequence X (k=1) with k=1 and the received sequence Y is calculated, Y is 0 and $X_j(k)Y_j$ is zero because the received sequence k=1 is not received in first three chip durations (j=1, 2, 3), and the received sequence Y is received and $X_j(k)$ and $Y_j$ have the value −1 or 1 in next chip durations (j=4, 5, 6, 7, 9), and the final autocorrelation $R_X(1)$ has the value of 3 by adding the calculated values.

Similarly, the electronic device 101 may calculate the autocorrelation with the received sequence Y with respect to the different k value. In FIG. 4, $R_X(3)=-1$, $R_X(4)=8$, and $R_X(6)=0$. Although not depicted in FIG. 4, the autocorrelation may be calculated with respect to the different k value. The electronic device 101 may estimate the delay time up to the recognized object using the value k if the autocorrelation value calculated for each k value is peak. In FIG. 4, if k is 4, the autocorrelation has the value 8 which is the peak, and thus the electronic device 101 may estimate the delay time until receiving the signal transmitted at the transmission timing 410 and reflected from the recognized object, as 4·chip duration.

According to one or more embodiments, if the Golay sequence is used as the sequence X, the autocorrelation has a maximum value at the peak in response to the delay time 0 and has 0 or a small value in response to the delay time which is not zero, and the electronic device 101 may easily acquire the delay time using the autocorrelation. According to another embodiment, if a sequence called a Golay complementary sequence or a Golay pair is used as the sequence X, the autocorrelation has a great value in response to the delay time 0 and becomes zero in response to the delay time which is not zero, and thus the electronic device 101 may acquire the delay time far more easily.

Figure 5:
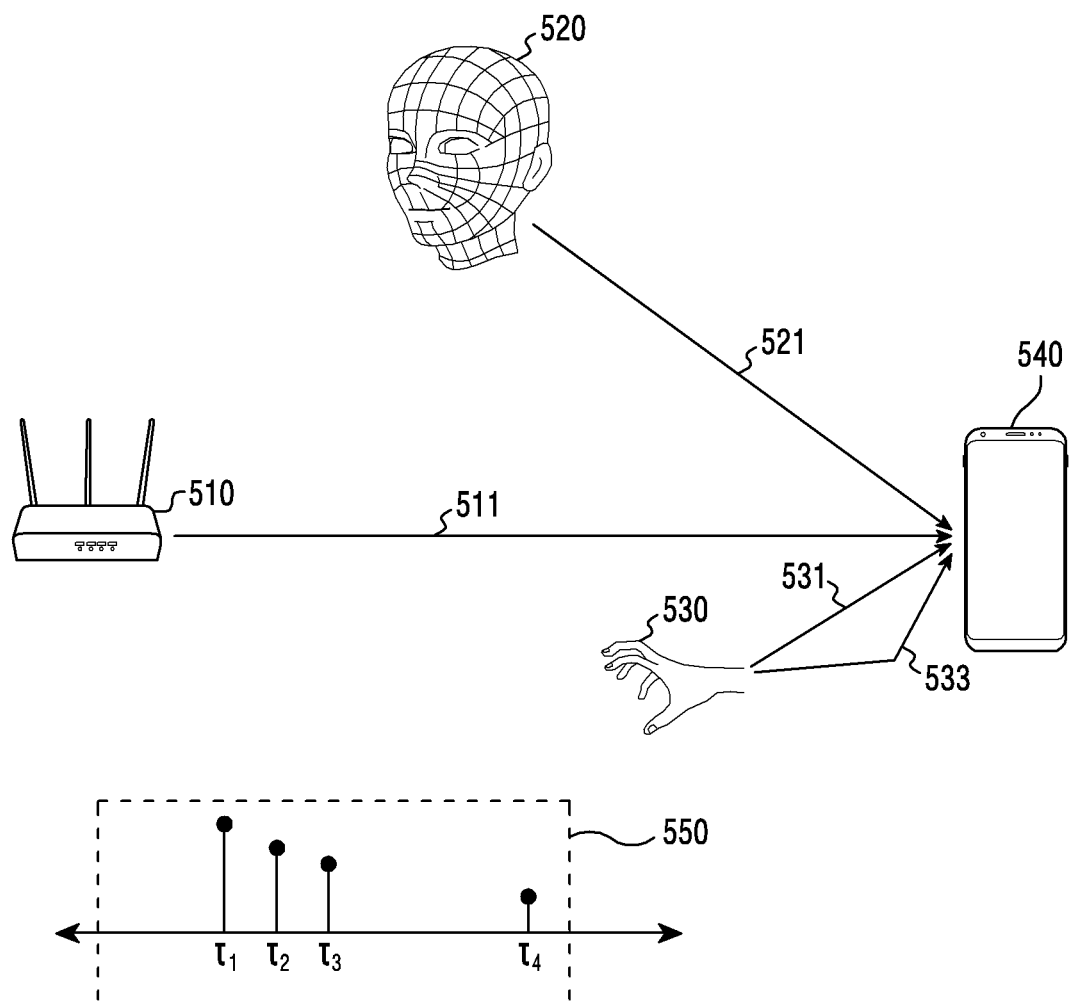
FIG. 5 is a diagram illustrating an example of channel estimation using a Golay sequence according to an embodiment the disclosure.

FIG. 5 is a diagram 500 illustrating an example of channel estimation using a Golay sequence according to an embodiment of the disclosure.

Referring to FIG. 5, if an electronic device 540 transmits the Golay sequence, the Golay sequence may be reflected from a peripheral object 510, 520, or 530 and received through another channel path 511, 521, 531, or 533. In so doing, the signal reflected from one object 530 may be received at the electronic device 540 via a plurality of channel paths 531 and 533. The electronic device 540 may receive the signal including a plurality of path components having a plurality of delay times 500 (e.g., τ1, τ2, τ3, or τ4), signal amplitudes and phases. In so doing, the number of paths (the number of taps) recognized by the electronic device 540 may vary according to an application or a solution, and the number of the paths (the number of the taps) recognized by the electronic device 540 may be preset. If the electronic device 540 performs the correlation on several delay times as described in FIG. 4, the peak appears at the same timings (e.g., τ1, τ2, τ3, or τ4) as the delay times 550 having the plurality of the path components. Signal attenuation and phase variation value experienced by the transmitted signal with respect to each path at the peak timing may be obtained, and the electronic device 540 may acquire path information for distance measurement to the peripheral object or object recognition, or channel impulse response (CIR), based on this information.

The 802.11ad, 802.11aj or 802.11ay system includes the Golay sequence in the CEF (e.g., the CEF 313, the L-CEF 353, or the EDMG-CEF 367), wherein the receiving device may conduct the channel estimation. Hence, the electronic device 101 including the wireless communication module 192 supporting the 802.11ad, 802.11aj or 802.11ay system may transmit the PPDU 310 or 350 including the Golay sequence. In so doing, to reduce overhead, the data field 317 or 357 may not be used or may carry only short information for a specific purpose. According to another embodiment, even if the PPDU 310 or 350 is used for general data transmission, the Golay sequence may be included in the CEF field to enable the channel estimation. In this case, the data field 317 or 357 may include data to transmit. The electronic device 101 for realizing the radar function using the signal of the 802.11ad, 802.11aj or 802.11ay system may transmit the PPDU 310 or 350 including the Golay sequence, and receive the signal reflected from the peripheral object. The electronic device 101 may estimate the CIR using the correlation characteristics of the Golay sequence or the Golay pair as described above. If the electronic device 101 transmits the PPDU 310 or 350 including the Golay sequence and then calculates the correlation with the signal received in relation to several delay times of the transmitted Golay sequence, the correlation value which is the peak in the time delay of each channel component received may be obtained, signal amplitude and phase information of a corresponding signal component in a corresponding time delay may be acquired, and thus the CIR may be estimated.

If the time delay corresponding to the correlation peak of the received signal reflected from a particular object and the transmitted signal is τ and a velocity of electromagnetic wave is $V_1$, a travel distance of the electromagnetic wave until the signal transmitted from the electronic device 101 is reflected from the object and received is $V_1 \cdot τ$. Since this distance corresponds to a round-trip distance to the corresponding object, the electronic device 101 may estimate that the object is at the distance of $(V_1 \cdot τ$. In the same mariner, the electronic device 101 using the wireless communication module for the 802.11ad, 802.11aj or 802.11ay system may estimate the distance to the object by using the Golay sequence. In addition, the 802.11ad, 802.11aj or 802.11ay system, which uses the wide bandwidth for the signal transmission, may be advantageous compared with other wireless communication scheme.

Theoretically, the chip duration is inversely proportional to the bandwidth according to duality of the bandwidth and the chip duration. The 802.11ad, 802.11aj or 802.11ay system uses the bandwidth of several GHz for the signal transmission, and accordingly the chip duration may be smaller than $10^{-9}$ second in the Golay sequence transmission. Since a resolution of a minimum detection time in the radar function corresponds to the chip duration 430 of the Golay sequence, a resolution of the distance detected by the electronic device 101 employing the 802.11ad, 802.11aj or 802.11ay system may be acquired by multiplying the chip duration 430 and the electromagnetic wave velocity $V_1$. This resolution reaches to the centimeter (cm) level if the signal of the 802.11ay system is used, and thus considerable precision may be achieved. Such high precision may enhance utilization of the electronic device 101 adopting the 802.11ad, 802.11aj or 802.11 wireless communication scheme in the application requiring high precision such as gesture or face recognition.

If the electronic device 101 uses a plurality of antennas in transmitting and/or receiving the signal for the radar function, the electronic device 101 may further acquire angle of arrival (AoA) and angle of departure (AoD) information, as well as the time delay, the amplitude, and the phase of the signal reflected and received. In addition, by transmitting a radar signal several times with time and analyzing pattern and phase information in receiving the reflected signal with respect to each of the transmitted signals, the electronic device 101 may be used for a basic sensing function which estimates a distance, a direction, and/or a velocity of several objects in vicinity, and an application which recognizes a gesture or a face using characteristics of the signal reflected from the face. By transmitting the signal several times and receiving the reflected signals, the electronic device 101 may identify the phase variation according to a micro movement of a living creature, which may be applied to live object (e.g., liveness) detection. The live object detection application may distinguish a live object and its picture, which is infeasible through camera photographing.

If the electromagnetic wave travels in a particular direction on a space, its travel distance is d, and a wavelength of the electromagnetic wave is λ, the phase variation occurred by the travel distance is 2πd/λ(radian). In the radar function based on the wireless communication system in the electronic device 101 as shown in FIG. 2A or FIG. 2B, the person performs the object sensing, the face recognition or the gesture recognition while holding the electronic device 101. In so doing, the electronic device 101 is subject to continuous slight location changes due to the micro movement of a person's body such as hand shaking The slight location change of the electronic device 101 causes a subtle distance change between the object and the electronic device 101, and causes a continuous slight phase variation according to the phase variation principle of the electromagnetic wave.

As discussed above, the phase variation is inversely proportional to the wavelength of the electromagnetic wave, and as the wavelength decreases, the phase variation may increase due to the micro movement. Table 1 shows degrees of the phase variation caused by the 1 mm micro movement in the wavelength of the electromagnetic wave in the frequency band 2.4 GHz, 5 GHz, or 60 GHz.

TABLE 1

| Frequency band | 2.4 GHz | 5 GHz | 60 GHz |
|---|---|---|---|
| Wavelength | 12.5 cm | 6 cm | 5 mm |
| Face variation caused by the 1 mm micro movement | 2.9 degree | 6 degree | 72 degree |

If the electronic device 101 is used for the radar function application such as face recognition, gesture recognition, or live object detection, the electronic device 101 may use a plurality of transmit antennas and receive antennas, and transmit and receive a signal several times with time. A plurality of phase information obtained from the signals received at the electronic device 101 may contain important information required for the recognition.

As explained above, the phase variation occurred by the micro movement of the person holding the electronic device 101 may serve as a kind of noise in the radar function, and cause recognition degradation. In addition, if the electronic device 101 is installed in a vehicle and used to monitor a vehicle interior and persons, phase variation noise may be occurred by a vehicle movement, and the phase noise occurred by the vibration or the movement of the electronic device 101 needs to be mitigated to enhance the precision of the recognition.

Figure 6:
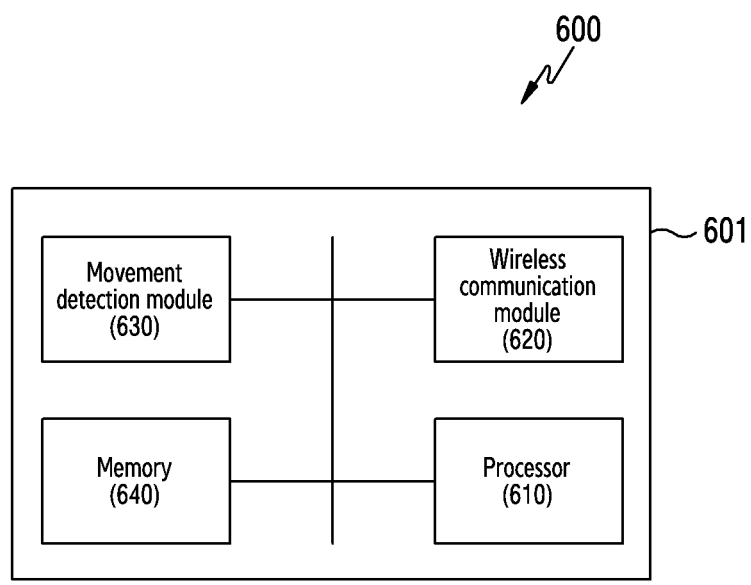
FIG. 6 is a block diagram illustrating an example of a functional configuration of an electronic device according to an embodiment the disclosure.

FIG. 6 is a block diagram 600 illustrating an example of a functional configuration of an electronic device according to one or more an embodiment of the disclosure. FIG. 6 illustrates the simplified functional configuration required to realize the disclosed method.

Referring to FIG. 6, an electronic device 601 may include, but not limited to, a processor 610 (e.g., the processor 120 of FIG. 1), a wireless communication module 620 (e.g., the wireless communication module 192 of FIG. 1), a movement detection module 630 (e.g., the sensor module 176 of FIG. 1) and/or a memory 640 (e.g., the memory 130 of FIG. 1). The electronic device 601 may omit at least one of those components, or may include one or more other components.

According to one or more embodiments, the processor 610 may control the wireless communication module 620 to transmit and receive signals, and receive signal transmission and reception times and CIR from the wireless communication module 620. According to one or more embodiments, the processor 610 may request location information from the movement detection module 630, and perform the aforementioned phase noise compensation by receiving a response. In so doing, the movement detection module 630 may transmit, in response, location information of a particular time or location change information based on a location at a reference time.

According to one or more embodiments, the wireless communication module 620 may transmit or receive a signal according to the wireless communication scheme such as 802.11ad, 802.11aj or 802.11ay. According to an embodiment, the wireless communication module 620 may generate and radiate a signal corresponding to the PPDU 310 or 350 of FIG. 3A or FIG. 3B via at least one antenna, to sense an object in vicinity, to recognize a gesture, to gesture a face, or to detect a live object. The wireless communication module 620 may radiate the signal in a particular direction using beamforming, or in all directions.

According to one or more embodiments, the wireless communication module 620 may include a Golay sequence or a Golay complementary sequence in a CEF (e.g., the CEF 313, the L-CEF 353, or the EDMG-CEF 367) of the PPDU 310 or 350 generated to realize the radar function. Alternatively, the wireless communication module 620 may insert a specifically designed sequence into the data field 317 or 357 to realize the radar function.

According to one or more embodiments, the wireless communication module 620 may generate and transmit the signal multiple times to realize the radar function for the object sensing, the gesture recognition, the face recognition or the live object detection.

According to one or more embodiments, the movement detection module 630 may detect a movement of the electronic device 601 caused by a user of the electronic device 601. The movement detection module 630 may include a sensor for detecting the movement of the electronic device 601, such as a gyro sensor, an acceleration sensor, a 6-axis sensor, or a shock sensor, and acquire a location change of the electronic device 601 in real time. According to an embodiment, the movement detection module 630 may acquire a quaternion using the gyro sensor, the acceleration sensor, the 6-axis sensor, or the shock sensor. The quaternion is a concept easier than a matrix in representing rotations in a space, and detailed descriptions on the quaternion are well known and thus omitted herein. According to an embodiment, if a rotational angular velocity for three axis of the electronic device 601 is measured using the gyro sensor, the quaternion may be acquired using only the value of the gyro sensor. The electronic device 601 may acquire a gravitational acceleration by applying a low pass filter to the time delay value acquired by the acceleration sensor, and compensate for the quaternion value for rotations of roll and pitch using a difference of the estimated gravitational acceleration and the actual gravitational acceleration. The electronic device 601 may acquire a more accurate quaternion value by compensating for the quaternion for yaw by use of a measurement value of a magnetometer.

The movement detection module 630 may calculate a movement angle of the changed 3 axis of the electronic device 601 based on the acquired quaternion value. This angle is referred to as Euler angle, and a method for calculating the Euler angle from the quaternion is well known and thus its detailed descriptions shall be omitted.

According to another embodiment, the movement detection module 630 acquires an acceleration vector value f and the gravitational acceleration g at a reference time using the acceleration sensor. In addition, an acceleration obtained using the following conversion equation can be obtained as an acceleration h projected on the horizontal plane of the electronic device 601.

$$h = \frac{f - (f \cdot g)g}{g \cdot g} \quad \text{Equation 1}$$

The gravitational acceleration g may be acquired by applying the low pass filter to the acceleration value acquired using the acceleration sensor. Since the acceleration h projected into the plane is the vector value, the movement detection module 630 may determine a movement direction using h. The movement detection module 630 may also calculate a movement distance by integrating h two times with respect to the movement time. Since an error value may considerably change with time, the electronic device 601 may use a Kalman filter to reduce the error. Thus, the movement detection module 630 may acquire the location change of the electronic device 601.

Based on the location change acquired by the movement detection module 630, the phase variation occurred by the movement of the electronic device 601 may be compensated.

According to one or more embodiments, the movement detection module 630 may receive a message requesting location information from the wireless communication module 620 or the processor 610, commence the location detection, and continuously provide the wireless communication module 620 or the processor 610 with the location detected in real time until the signal transmission according to the radar frame (e.g., a radar frame 710 of FIG. 7) is completed. If the signal transmission according to the radar frame 710 is finished, the movement detection module 630 may terminate the location detection.

According to one or more embodiments, the memory 640 may store instructions to be executed by the processor 610 to implement operations of the phase compensation method of the disclosure to be explained. The memory 640 may store user authentication information required in an application such as user authentication by applying the phase compensation method of the disclosure. The user authentication information may be related to the phase information acquired by receiving the signal reflected from the object with respect to at least one signal transmitted from the wireless communication module 620 as mentioned earlier.

Figure 7:
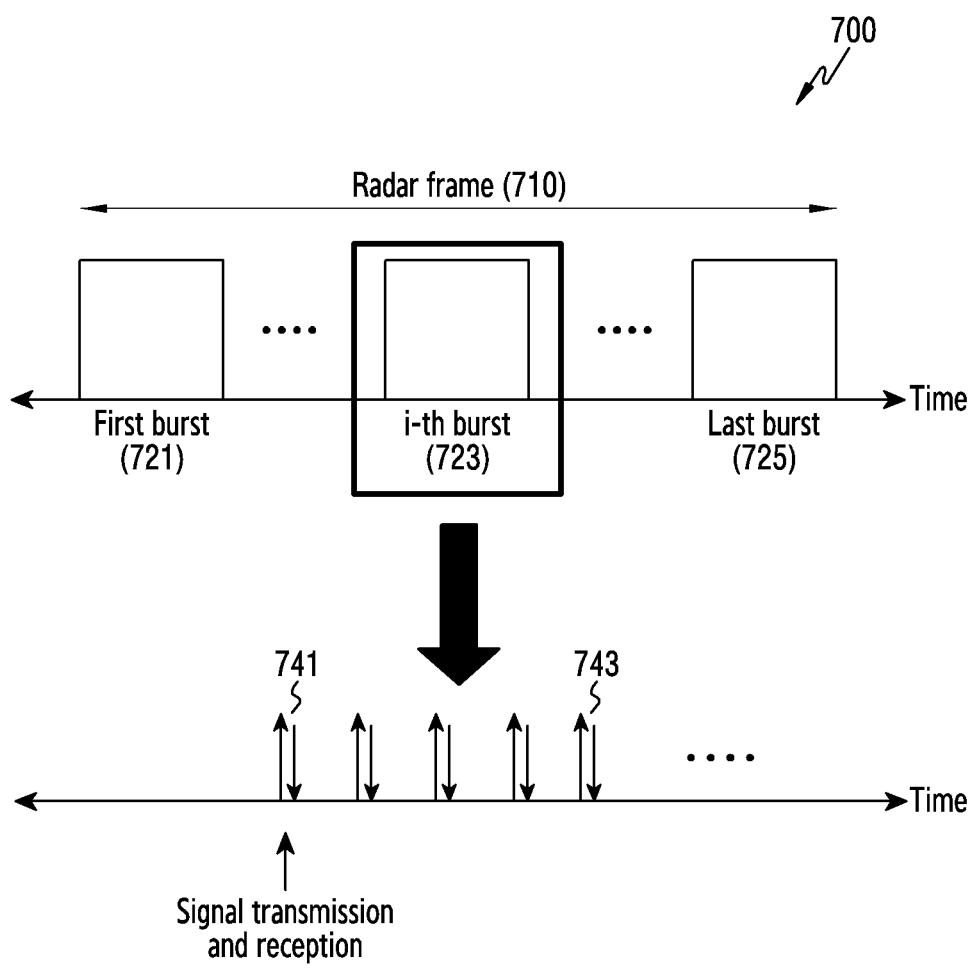
FIG. 7 is a diagram illustrating signals transmitted by a wireless communication module according to an embodiment the disclosure.

FIG. 7 is a diagram 700 illustrating signals transmitted by a wireless communication system according to an embodiment of the disclosure. Referring to FIG. 7, the radar frame 710 may be defined. The wireless communication module 620 may generate and transmit the radar frame 710 for the object sensing, the gesture recognition, the face recognition or the live object detection. The radar frame 710 may include a plurality of bursts (e.g., M-ary bursts) 721, 723, or 725, and each burst 721, 723, or 725 may include a plurality of signals (e.g., k-ary signals) 741 through 743.

According to one or more embodiments, the wireless communication module 620 may transmit a plurality of signals according to the radar frame 710, and receive a signal reflected from an object. A start time of each burst in the radar frame 710, for example, an interval between transmission times of first signals of the bursts and the number of the bursts may be preset, and an interval between signals transmitted in each burst and the number of the signals may be preset. The interval between the signals needs to be longer than the time of receiving the reflected signal.

According to one or more embodiments, the wireless communication module 620 may transmit a signal according to the radar frame 710, receive the reflected signal, and extract received signal characteristics from a plurality of receive antennas or a beam combination or extract received signal characteristics based on time. Based on the extracted received signal characteristics, the wireless communication module 620 may perform the face recognition, the gesture recognition, the sensing, or the live object detection. Alternatively, the wireless communication module 620 may provide the extracted received signal characteristics to the processor 610, and the processor 610 may perform the face recognition, the gesture recognition, the sensing, or the live object detection.

According to one or more embodiments, the wireless communication module 620 may receive the signal reflected from at least one object with respect to one signal transmission, and acquire the CIR using the correlation as shown in FIG. 5. According to the number and the distance of objects or the propagation path, the wireless communication module 620 may acquire the CIR where impulses occurs at different timings. Each impulse component in the CIR may have the phase value according to the distance to the object.

According to one or more embodiments, if the wireless communication module 620 receives the reflected signal via a plurality of antennas or an antenna array, a direction of the signal reception may be estimated based on a delay time measured at each antenna. According to an embodiment, if an object is tilted at q degrees in a vertical direction of a plane where antenna arrays are disposed and a spacing between antennas of the antenna array is d, signals received between neighboring antennas of the antenna array have a distance difference by d·sin θ. Hence, by obtaining a time difference of the signals received at the antennas of the antenna array, the distance difference may be obtained from it and the orientation of the object may be estimated. Estimating the signal reception direction has been studied for a long time in electronic engineering, and may use an algorithm of the related art such as multiple signal classification (MUSIC), or estimation of signal parameters by rotational invariance techniques (ESPRIT).

Based on the estimated signal reception direction, the wireless communication module 620 may estimate in which direction a particular object is located in relation to the electronic device 601.

FIG. 8A through FIG. 8F are respectively numbered diagrams 810, 820, 830, 840, 850, and 860 illustrating examples of a time relation between a signal transmitted by a wireless communication module and location information obtained by a motion detection module according to various embodiments of the disclosure.

Referring to FIG. 8A through FIG. 8F, the wireless communication module 620 may transmit a plurality of bursts 871, 873 and 875 including a plurality of signals to realize the radar function. An initial signal transmitted by the wireless communication module 620 for the radar function may be transmitted at, but not limited to, a reference time 800. The reference time 800 may be set to a random time before transmitting the plurality of the signals for the radar function.

Figure 8A:
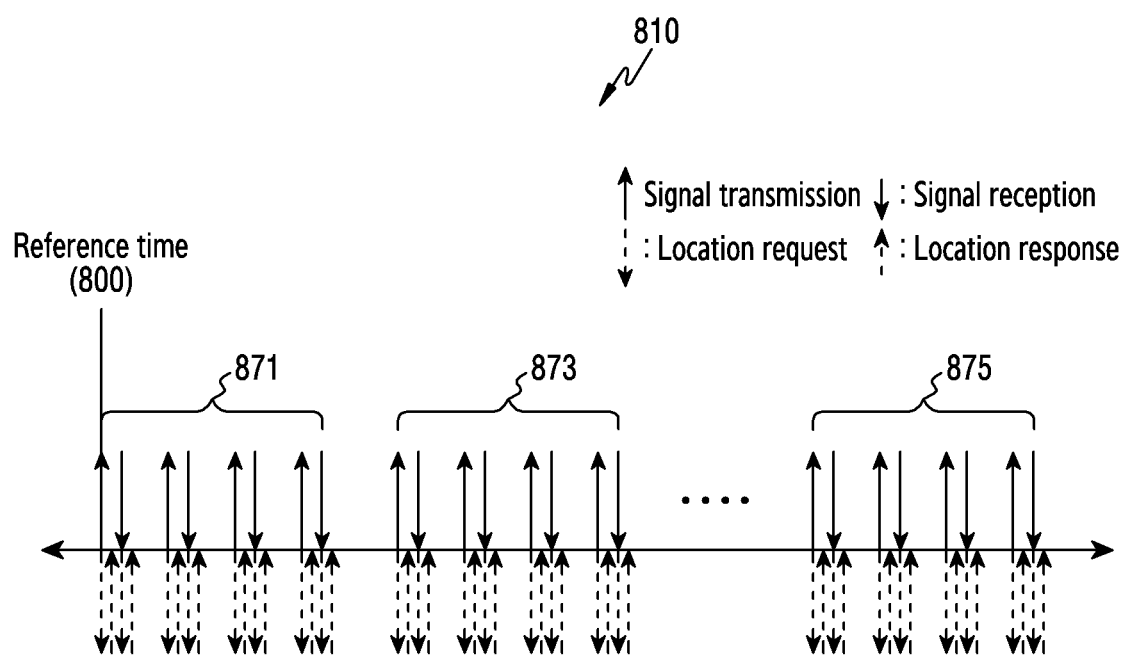
FIG. 8A is a diagram illustrating an example of a time relation between a signal transmitted by a wireless communication module and location information obtained by a motion detection module according to an embodiment the disclosure.

According to one or more embodiments, the wireless communication module 620 or the processor 610 may request location information from the movement detection module 630 in every signal transmission and reception as shown in FIG. 8A, and the movement detection module 630 may provide the location information to the wireless communication module 620 or the processor 610 in response to the request.

Figure 8B:
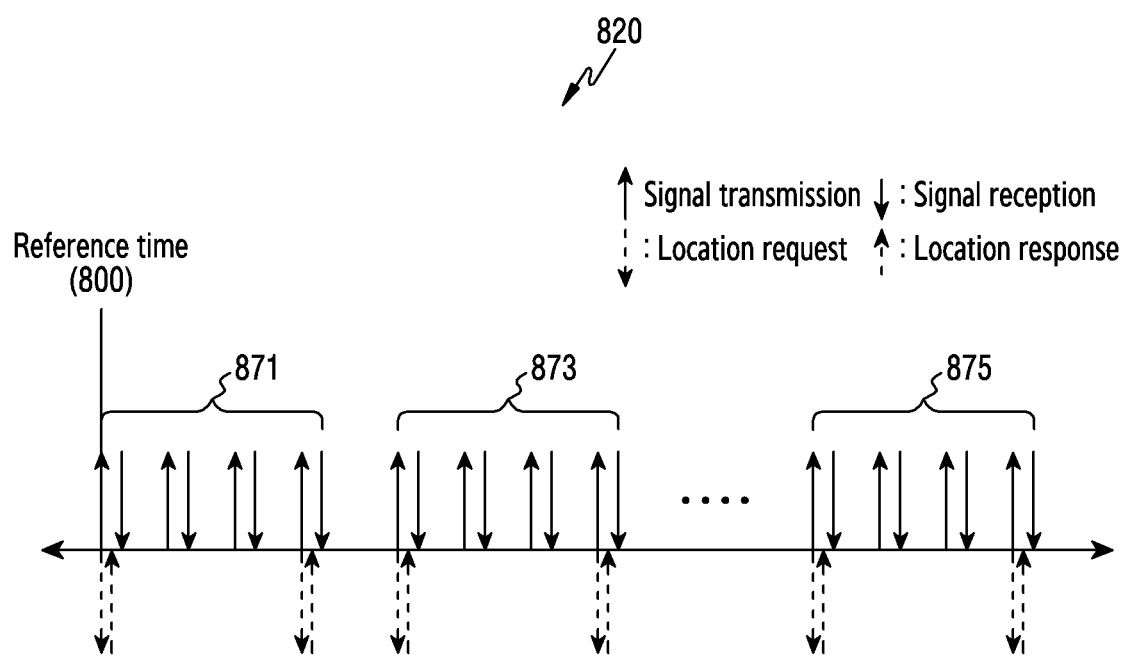
FIG. 8B is a diagram illustrating an example of the time relation between the signal transmitted by the wireless communication module and the location information obtained by the motion detection module according to an embodiment the disclosure.

According to other embodiments, the wireless communication module 620 or the processor 610 may request the location information from the movement detection module 630 at the initial signal transmission and the last signal transmission in each burst 871, 873, or 875 as shown in FIG. 8B, and the movement detection module 630 may provide the location information to the wireless communication module 620 or the processor 610 in response to the request.

Figure 8C:
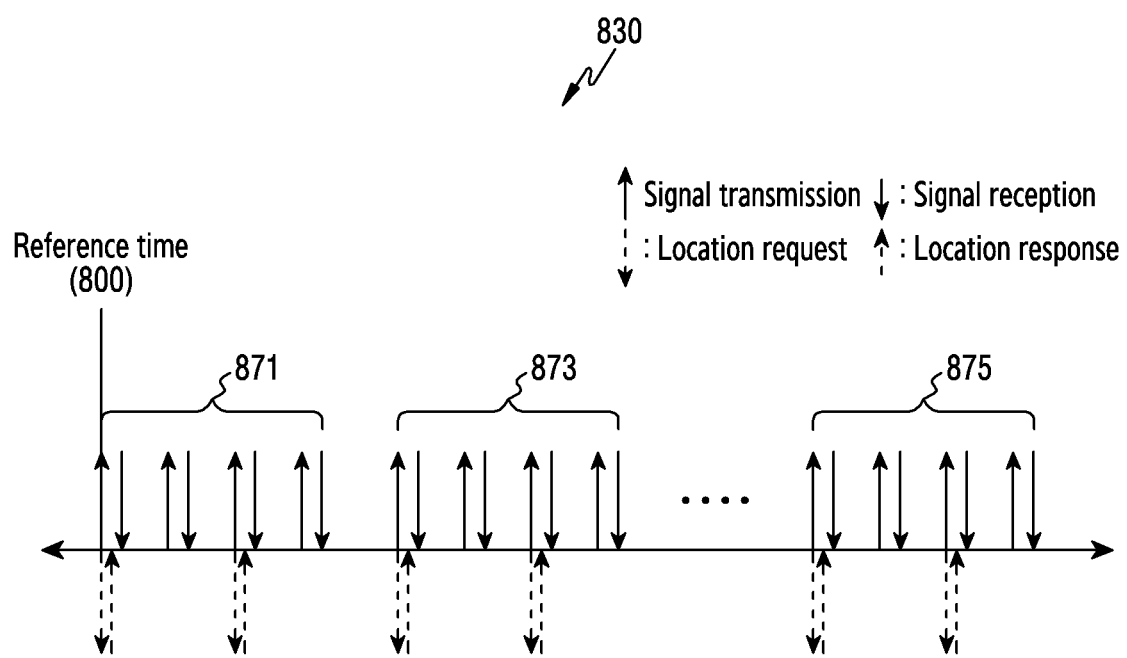
FIG. 8C is a diagram illustrating an example of the time relation between the signal transmitted by the wireless communication module and the location information obtained by the motion detection module according to an embodiment the disclosure.

According to other embodiments, the wireless communication module 620 or the processor 610 may request the location information from the movement detection module 630 if a signal is transmitted at specific time intervals, or a specific number of signals are transmitted in each burst 871, 873, or 875 as shown in FIG. 8C, and the movement detection module 630 may provide the location information to the wireless communication module 620 or the processor 610 in response to the request.

According to other embodiments, the wireless communication module 620 or the processor 610 may request the location information from the movement detection module 630 at particular time intervals or every time a specific number of signals are transmitted within the radar frame 730, and the movement detection module 630 may provide the location information to the wireless communication module 620 or the processor 610 in response to the request.

The above embodiments may be effective if the movement detection module 630 does not know the configuration of the radar frame. If the movement detection module 630 knows the configuration of the radar frame or transmits the location information at particular time intervals or at time intervals according to a preset pattern, there may be a location acquisition method for remarkably reducing the request signal transmission.

Figure 8D:
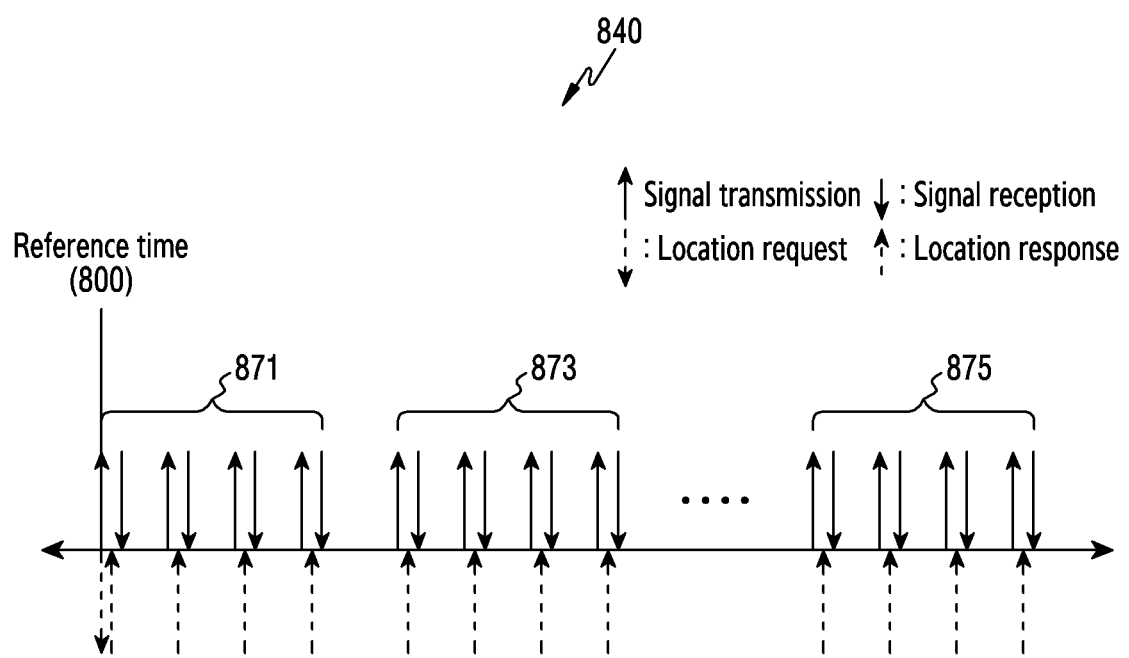
FIG. 8D is a diagram illustrating an example of the time relation between the signal transmitted by the wireless communication module and the location information obtained by the motion detection module according to an embodiment the disclosure.
Figure 8E:
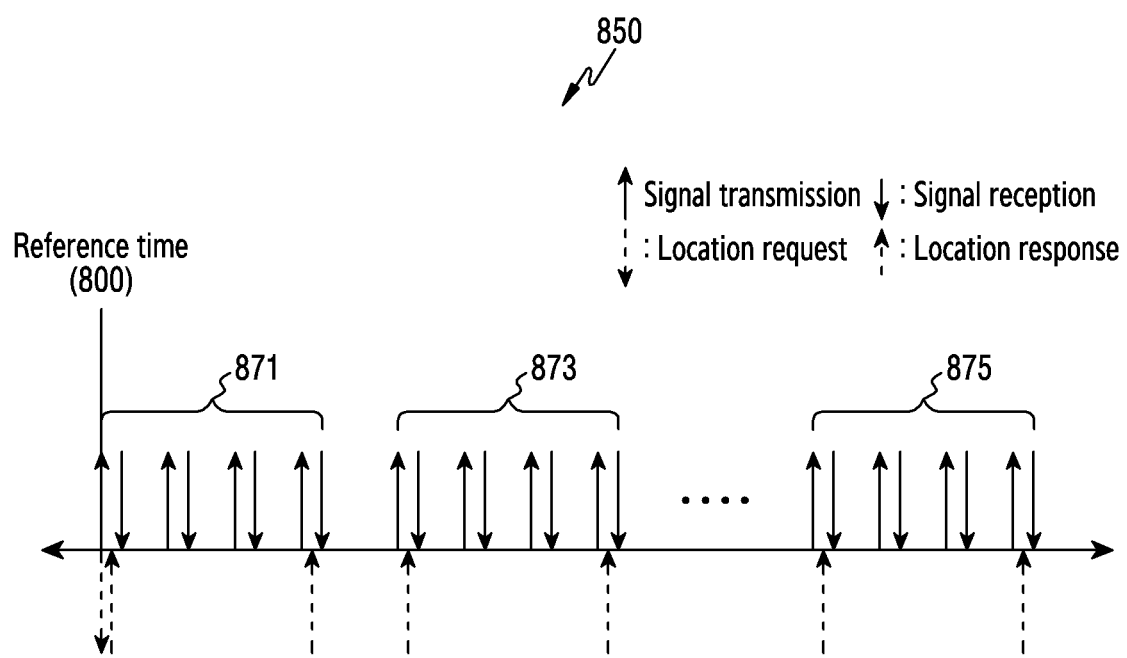
FIG. 8E is a diagram illustrating an example of the time relation between the signal transmitted by the wireless communication module and the location information obtained by the motion detection module according to an embodiment the disclosure.
Figure 8F:
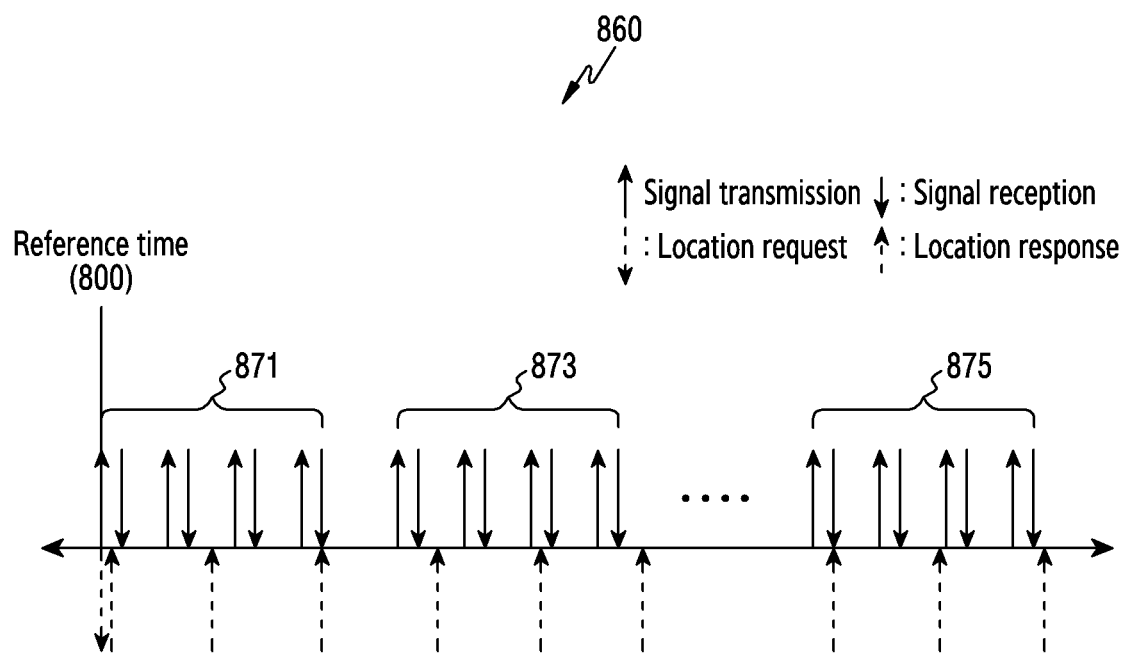
FIG. 8F is a diagram illustrating an example of the time relation between the signal transmitted by the wireless communication module and the location information obtained by the motion detection module according to an embodiment the disclosure.

According to one or more embodiments, the wireless communication module 620 or the processor 610 may request the location information from the movement detection module 630 only at the initial signal transmission for the radar function as shown in FIGS. 8D, 8E, and 8F. The movement detection module 630 receiving the request may transmit the location information to the wireless communication module 620 or the processor 610 at the particular time intervals or at the time intervals according to the preset pattern. According to an embodiment, referring to FIG. 8D, the movement detection module 630 knowing the configuration of the radar frame may obtain every signal transmission time based on the received request, acquire the location information at every signal transmission timing, and transmit the location information to the wireless communication module 620 or the processor 610. Alternatively, if the movement detection module 630 is configured to obtain the location information at every signal transmission timing according to the configuration of the radar frame, the movement detection module 630 may acquire the location information according to a preset pattern (or time) and transmit the location information to the wireless communication module 620 or the processor 610. According to another embodiment, as shown in FIG. 8E, the movement detection module 630 may acquire the location information only at the initial signal transmission and the last signal transmission in each burst 871, 873, or 875, and provide the location information to the wireless communication module 620 or the processor 610. According to another embodiment, as shown in FIG. 8E, the movement detection module 630 may acquire the location information at preset intervals or at specific time intervals and provide the location information to the wireless communication module 620 or the processor 610. The embodiments of FIG. 8D through 8F illustrate that the movement detection module 630 knows the configuration of the radar frame, and is triggered by the location request signal of the wireless communication module 620 or the processor 610 to acquire the location information in a preset manner and transmit the location information to the wireless communication module 620 or the processor 610. The embodiments of FIG. 8D through 8F illustrate that the movement detection module 630 acquires the location information without the additional location request signal from the wireless communication module 620 or the processor 610 and transmits the location information to the wireless communication module 620 or the processor 610 as shown in FIGS. 8A, 8B and 8C.

In FIGS. 8B, 8C, 8E and 8F, the location information of particular signal transmission and reception may not be acquired unlike FIGS. 8A and 8D. In this case, the location information of the particular signal transmission and reception may be approximately acquired using interpolation with the location information acquired before and/or after the signal transmission timing and reception timing. Alternatively, location change information of the particular signal transmission and reception may be acquired from location change information based on the location information acquired before and/or after the particular signal transmission timing and reception timing, to be explained. In so doing, the interpolation may be used.

The movement detection module 630 may transmit the location information detected at each time to the wireless communication module 620 or the processor 610, whereas the movement detection module 630 may transmit difference information from the location measured at the reference time or movement information at the reference time 800, as the location information.

According to one or more embodiments, the processor 610 may compensate for phase noise occurred by the movement of the electronic device 101 based on orientation information of the object estimated (or recognized) at the wireless communication module 620 and the location information or the movement information acquired at the movement detection module 630.

Figure 9:
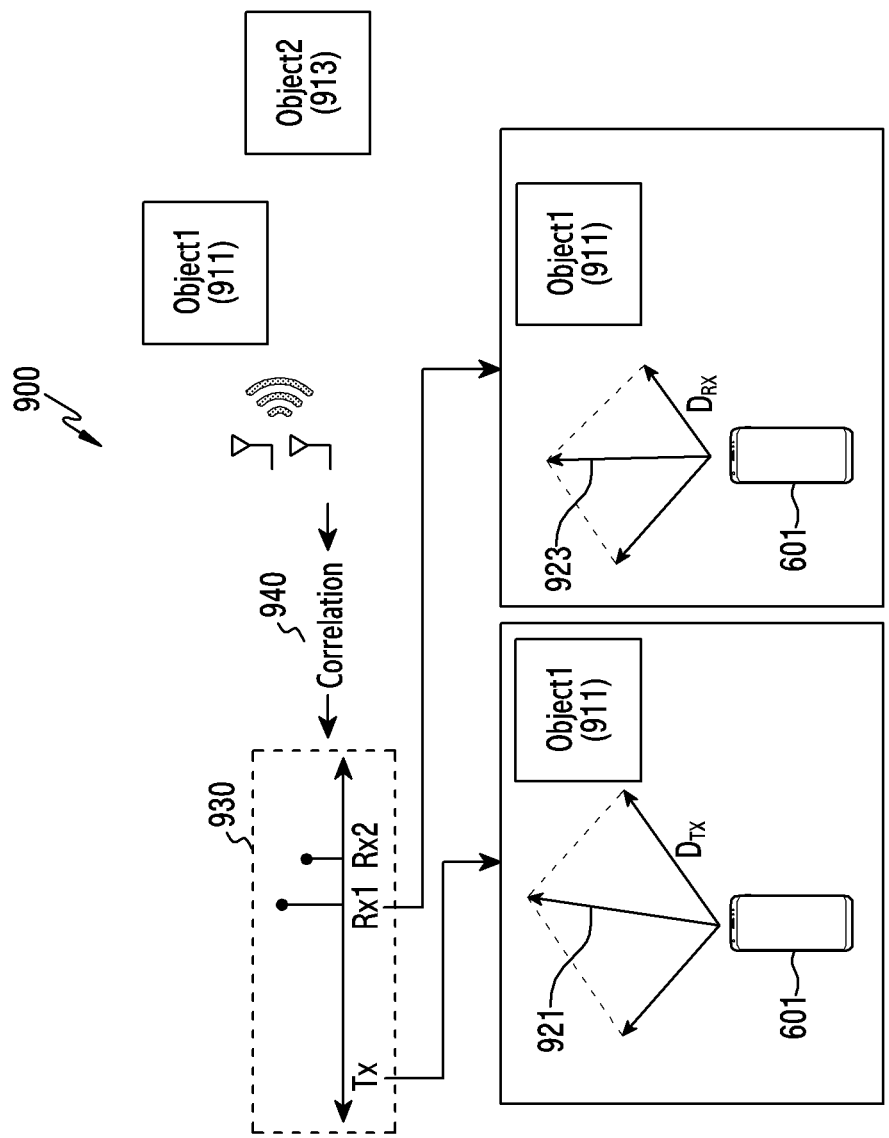
FIG. 9 is a diagram illustrating an example of phase noise compensation according to an embodiment the disclosure.

FIG. 9 is a diagram 900 illustrating an example of phase noise compensation according to an embodiment of the disclosure.

Referring to FIG. 9, the wireless communication module 620 of the electronic device 601 may receive a signal combining a signal reflected from a first object 911 and a signal reflected from a second object 913 with respect to one transmitted signal, and acquire CIR 930 by performing correlation 940. In the CIR 930, Tx indicates a signal transmission timing, Rx1 indicates an impulse response by the signal reflected from the first object 911, and Rx2 indicates an impulse response by the signal reflected from the second object 913. The wireless communication module 620 may acquire a location change vector 921 of the signal transmission and a location change vector 923 of the signal reception reflected from the first object 911 based on the location information or the movement information received from the movement detection module 630. The location change vector may indicate a difference of a location at a reference time (e.g., the reference time 800 of FIGS. 8A through 8E) and a location at the timing when the signal reflected from the first object 911 is received.

According to one or more embodiments, the wireless communication module 620 may recognize an orientation of the first object 911 using the algorithm such as MUSIC or ESPRIT. The wireless communication module 620 may divide the location change vector 921 of the signal transmission and the location change vector 923 of the reflected signal reception into a component $d_{T_X}$ and $d_{R_X}$ matching the orientation of the first object 911 and a component perpendicular to the orientation of the first object 911. The phase noise is affected by the component of the location change vector matching the orientation of the first object 911 and is not affected by the component of the location change vector perpendicular to the orientation of the first object 911. Hence, as shown in FIG. 8A, with the location change of the signal transmission and the location change of the signal reception, the location change for the reference time of the signal transmission may cause the phase noise of $$2\pi \frac{d_{T_X}}{\lambda} \text{ (radian)}$$

and the location change for the reference time of the signal reception may cause the phase noise of $$2\pi \frac{d_{R_X}}{\lambda} \text{ (radian)}.$$

Thus, it the phase value θ is acquired at the peak corresponding to a corresponding object (e.g., the first object 911) in the CIR, the wireless communication module 620 may compensate for the phase noise due to the movement from the reference time by calculating $$\theta - 2\pi \frac{d_{T_X}}{\lambda} - 2\pi \frac{d_{R_X}}{\lambda}.$$

If the unit of the phase value is degrees, the phase noise may be compensated by calculating θ−

$$360 \frac{d_{T_X}}{\lambda} - 360 \frac{d_{R_X}}{\lambda}.$$

The embodiment of FIG. 8A illustrates that the location change is obtained at the signal transmission and the signal reception. In this case, since the signal travels at the speed of light (3×10⁸ m/s), an object approaching within 1 m may have little movement because the delay time between the signal transmission and the signal reception is merely several nanoseconds. However, in view of the radar frame 710, there is the considerable time difference between the initial signal transmission and the final signal transmission and thus the location change due to the movement may occur. Compared with the phase information acquired for the initial signal, the phase information of the signal transmitted later may include the phase noise based on the location change. To address the phase noise, the wireless communication module 620 may obtain the location change vector of each signal transmission from the movement detection module 630 based on the initial signal transmission (e.g., the reference time 800 of FIG. 8A through FIG. 8F) or based on an arbitrary time before the signal transmission using the method of FIG. 8B through FIG. 8F, extract the component (e.g., $d_{T_X}$ of FIG. 9) matching the orientation of the object recognized in the obtained location change vector, and mitigate the phase noise by reflecting it.

According to an embodiment, the wireless communication module 620 may transmit each signal, receive the reflected signal, acquire the CIR for the received signal, subtract twice $$\left( \theta - 2\pi \frac{d_{T_X}}{\lambda} \right)$$

the phase noise $$2\pi \frac{d_{T_X}}{\lambda}$$

by the component matching the object orientation in the location change vector from the phase θ of the correlation value peak, and thus mitigate the phase noise based on the location change. Herein, the phase noise is subtracted twice because it is assumed that the same phase noise occurs in the signal transmission and the signal reception.

As above, the electronic device 601 may mitigate the phase noise due to the movement of the electronic device 601, reflect it in the obtained CIR, and thus acquire more precise CIR.

According to one or more embodiments, the processor 610 or the wireless communication module 620 of the electronic device 601 may perform the object sensing, the face recognition, the gesture recognition or the live object detection, by analyzing or by statistically processing and analyzing the CIR information including the amplitude information and the phase information acquired by transmitting the signals of the radar frame 710.

While the phase noise mitigation function is performed at the wireless communication module 620 in the above descriptions, more functions may be fulfilled at the processor 610, or at the processor 610 combined with the wireless communication module 620.

According to one or more embodiments, the processor 610 may receive the reference time 800, the signal transmission and reception times, and the CIR from the wireless communication module 620 by controlling the wireless communication module 620, request the location information from the movement detection module 630, receive its response, and perform the phase noise compensation.

Through the compensation for mitigating the phase noise due to the movement of the electronic device 101 or 601, the electronic device 101 or 601 may obtain the more precise phase information of the signal reflected from the object with respect to the plurality of the transmit signals, and thus conduct the operation requiring the high phase precision such as object sensing, face recognition, gesture recognition or live object detection.

According to one or more embodiments, an electronic device (e.g., the electronic device 101 of FIG. 1 or the electronic device 601 of FIG. 6) may include a wireless communication module (e.g., the wireless communication module 192 of FIG. 1 or the wireless communication module 620 of FIG. 6), a movement detection module (e.g., the movement detection module 630 of FIG. 6) for detecting a movement of the electronic device, at least one processor (e.g., the processor 120 of FIG. 1 or the processor 610 of FIG. 6) operatively coupled with the wireless communication module and the movement detection module, and at least one memory (e.g., the memory 130 of FIG. 1 or the memory 640 of FIG. 6) operatively coupled with the at least one processor, wherein the at least one memory may store instructions, when executed, causing the at least one processor to transmit at least one signal to recognize an external object, by controlling the wireless communication module, receive at least one signal transmitted and reflected from the external object, by controlling the wireless communication module, obtain a channel impulse response based on the transmitted signal and the received signal, obtain orientation information of the external device based on the at least one received signal, detect phase noise occurred by a movement of the electronic device, by controlling the movement detection module, extract a component matching an orientation of the external device from the detected phase noise, and compensate for phase information in the channel impulse response based on the component matching the orientation of the external device.

According to one or more embodiments, the instructions may cause the at least one processor to calculate a correlation value of the transmitted signal and the received signal, obtain a peak timing of the correlation value, and obtain amplitude and phase information of the received signal.

According to one or more embodiments, the electronic device may further include at least one antenna (e.g., the antenna module 197 of FIG. 1 or the antenna array 211 of FIG. 2A), wherein the instructions may cause the at least one processor to obtain a delay time of a signal received at each of the at least one antenna with respect to the transmitted signal, and obtain orientation information of the external object based on the delay time of the signal received at each of the at least one antenna.

According to one or more embodiments, the instructions may cause the at least one processor to, by controlling the movement detection module, obtain first location information of the electronic device at a reference time, obtain second location information of the electronic device in transmitting the signal and/or receiving the reflected signal, and obtain location change information indicating a difference between the reference time and a location of the signal transmission and/or the reflected signal reception based on the second location information and the first location information, extract a component matching the orientation of the external device from the location change information, and detect the phase noise based on the extracted component of the location change information matching the orientation of the external device.

According to one or more embodiments, the instructions may cause the at least one processor to transmit a message requesting location information to the movement detection module, and obtain the location information or the location change information from the movement detection module, in response to the request message.

According to one or more embodiments, the instructions may cause the at least one processor to transmit a message requesting location information to the movement detection module, and obtain the location information or the location change information from the movement detection module at particular time intervals or at time intervals according to a preset pattern, in response to the request message.

According to one or more embodiments, the instructions may cause the at least one processor to obtain the location change information of the signal transmission and/or the reflected signal reception by compensating for the obtained location change information using interpolation with respect to around view in the signal transmission and/or the reflected signal reception.

According to one or more embodiments, the instructions may cause the at least one processor to extract a movement distance d of the electronic device toward the external object from the location change information as the component matching the orientation of the external device in the location change information, and detect the phase noise based on the movement distance d and a wavelength $\lambda$ of an electromagnetic wave carrying the signal, and compensate for the phase information by subtracting the detected phase noise from the phase information of the obtained impulse response.

According to one or more embodiments, the wireless communication module may be operated according to an 802.11ad, 802.11aj or 802.11ay wireless communication scheme, the signal may include a PPDU of the 802.11ad, 802.11aj or 802.11ay, and the PPDU may include a Golay sequence or a Golay complementary sequence to assist in obtaining the channel impulse response.

According to one or more embodiments, the instructions may cause the at least one processor to perform face recognition, gesture recognition, or live object detection based on the compensated phase information.

According to one or more embodiments, an electronic device (e.g., the electronic device 101 of FIG. 1 or the electronic device 601 of FIG. 6) may include a wireless communication module (e.g., the wireless communication module 192 of FIG. 1 or the wireless communication module 620 of FIG. 6), a movement detection module (e.g., the movement detection module 630 of FIG. 6) for detecting a movement of the electronic device, and at least one processor (e.g., the processor 120 of FIG. 1 or the processor 610 of FIG. 6) operatively coupled with the wireless communication module and the movement detection module, wherein the wireless communication module may transmit at least one signal to recognize an external object, receive at least one signal transmitted and reflected from the external object, obtain a channel impulse response based on the transmitted signal and the received signal, obtain orientation information of the external device based on the at least one received signal, receive a detected phase noise from the movement detection module, extract a component matching an orientation of the external device from the detected phase noise, and compensate for phase information in the channel impulse response based on the component matching the orientation of the external device, and the movement detection module may obtain first location information of the electronic device at a reference time, obtain second location information of the electronic device in transmitting the at least one signal and/or receiving the reflected signal, obtain location change information indicating a difference between the reference time and a location of the at least one signal transmission and/or the reflected signal reception based on the second location information and the first location information, extract a component matching the orientation of the external device from the location change information, and detect the phase noise based on the extracted component of the location change information matching the orientation of the external device.

Now, a method for compensating for phase noise due to a movement of the electronic device 101 or 601 in the object recognition using the electronic device 101 or 601 is described.

Figure 10:
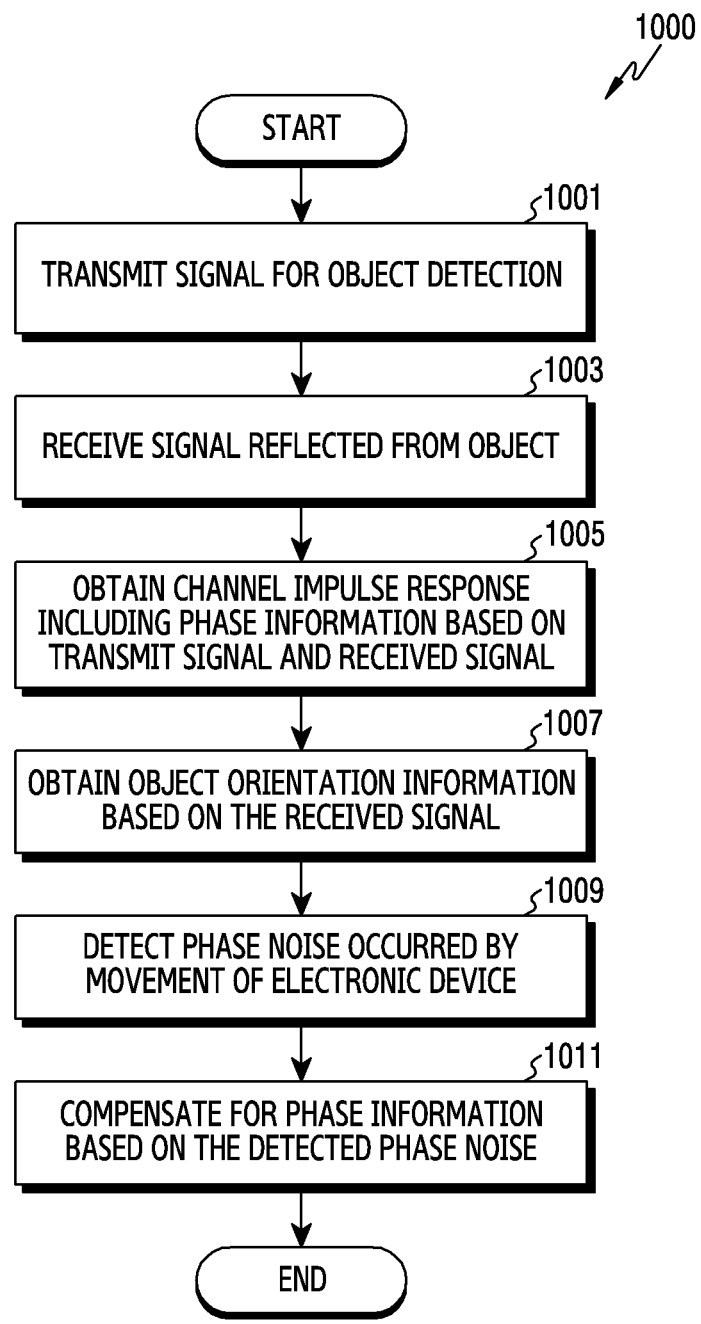
FIG. 10 is a flowchart illustrating phase noise compensation due to movement of an electronic device in object recognition of the electronic device according to an embodiment the disclosure.

FIG. 10 is a flowchart 1000 illustrating phase noise compensation based on movement of an electronic device in object recognition of the electronic device according to an embodiment of the disclosure.

The operating entity of the flowchart 1000 of FIG. 10 may be construed to be an electronic device (e.g., the electronic device 101 of FIG. 1 or the electronic device 601 of FIG. 6) or a processor (e.g., the processor 120 of FIG. 1 or the processor 610 of FIG. 6) of the electronic device.

Referring to FIG. 10, according to one or more embodiments, in operation 1001, the electronic device 101 or 601 may transmit a signal (e.g., the signal X transmitted at the transmission timing 410 of FIG. 4) through a wireless communication module (e.g., the wireless communication module 192 of FIG. 1 or the wireless communication module 620 of FIG. 6) for the object detection, the face recognition, or the gesture recognition. The signal transmitted from the electronic device 101 or 601 may include the PPDU 310 according to the 802.11ad wireless communication scheme of FIG. 3A, the PPDU 350 according to the 802.11ay wireless communication scheme of FIG. 3B, or a physical layer packet according to other wireless communication scheme. According to an embodiment, the CEF 313 of the PPDU 310 according to the 802.11ad wireless communication scheme of FIG. 3A or the L-CEF 353 or the EDMG-CEF 367 of the PPDU 350 according to the 802.11ay wireless communication scheme of FIG. 3B may carry the Golay sequence or the Golay complementary sequence for the channel estimation. If using other wireless communication scheme, the electronic device 101 or 601 may include the Golay sequence in the data field of the physical layer packet to enable the channel estimation.

According to one or more embodiments, in operation 1003, the electronic device 101 or 601 may receive a signal transmitted in operation 1001 and reflected from a peripheral object, through the wireless communication module (e.g., the wireless communication module 192 of FIG. 1 or the wireless communication module 620 of FIG. 6). The signal reflected from the peripheral object may go through delay of the transmitted signal according to the twofold distance between the electronic device 101 or 601 and the object and then be received at the electronic device 101 or 601.

According to one or more embodiments, in operation 1005, the electronic device 101 or 601 may calculate a correlation value of the received signal (e.g., Y of FIG. 4) and a signal (e.g., X(k)) delayed from the transmit signal by k times of the chip duration 430, obtain k (e.g., k=4 in FIG. 4) where the correlation value is peak, and thus determine the delay time to 4·chip duration. In addition, the electronic device 101 or 601 may calculate CIR by detecting amplitude and phase of the receive signal at the peak of the correlation time. If the transmitted signal goes through multi-path, a plurality of timings at which the correlation value is peak may appear, and the impulse response may appear at multiple times in the CIR. However, the disclosure may use only one impulse response of the greatest amplitude of the signal received first in spite of the multi-path. If the CIR has the impulse at a particular delay time, the electronic device 101 or 601 may determine that the object is detected. In response to no impulse, the electronic device 101 or 601 may determine no object reflecting the transmit signal.

According to one or more embodiments, in operation 1007, the electronic device 101 or 601 may obtain orientation information of the recognized object. According to an embodiment, the electronic device 101 or 601 may include a plurality of antennas, and estimate a signal reception direction by measuring the delay time of the signal received at each antenna. According to an embodiment, if an object is tilted at q degrees in a vertical direction of a plane where antenna arrays are disposed and a spacing between antennas of the antenna array is d, signals received between neighboring antennas of the antenna array have a distance difference by d·sin θ. Hence, by obtaining a time difference of the signals received at the antennas of the antenna array, the distance difference may be obtained from it and the orientation of the object may be estimated. The electronic device 101 or 601 may use the algorithm such as MUSIC or ESPRIT, as the algorithm for estimating the signal reception direction. According to an embodiment, if using the beamforming, the electronic device 101 or 601 may transmit a signal in a beamforming direction, and upon receiving a reflected signal, determine the orientation of the object based on the beamforming direction.

Operations 1005 and 1007 may be performed at the same time, and may be fulfilled by sharing calculating the delay time of the received signal of each antenna.

According to one or more embodiments, in operation 1009, the electronic device 101 or 601 may detect phase noise occurred by its movement. The location of the electronic device 101 or 601 may change in transmitting and receiving the signals in operation 1001 and operation 1003, due to a micro movement such as hand shaking of the user holding the electronic device 101 or 601 in his/her hand, or a movement of a device (e.g., a vehicle) to which the electronic device 101 or 601 is mounted. The location change of the electronic device 101 or 601 may generate phase noise, and decrease accuracy of the phase of the CIR acquired in operation 1005. To remove the noise in the phase of the CIR acquired in operation 1005, the electronic device 101 or 601 may extract the component $d_{T_X}$ and $d_{R_X}$ matching the object orientation using the location change vector of the signal transmission timing and the location change vector of the signal reception timing as shown in FIG. 9, and thus detect the phase noise (e.g., $$360\frac{d_{R_X}}{\lambda} - 360\frac{d_{T_X}}{\lambda}$$

calculated from the location change vector of FIG. 9) according to the location change of the electronic device 101 or 601.

According to one or more embodiments, in operation 1011, the electronic device 101 or 601 may acquire more accurate phase information with the phase noise mitigated, by subtracting the phase noise detected in operation 1009 from the phase information of the received signal detected in operation 1005.

Figure 11:
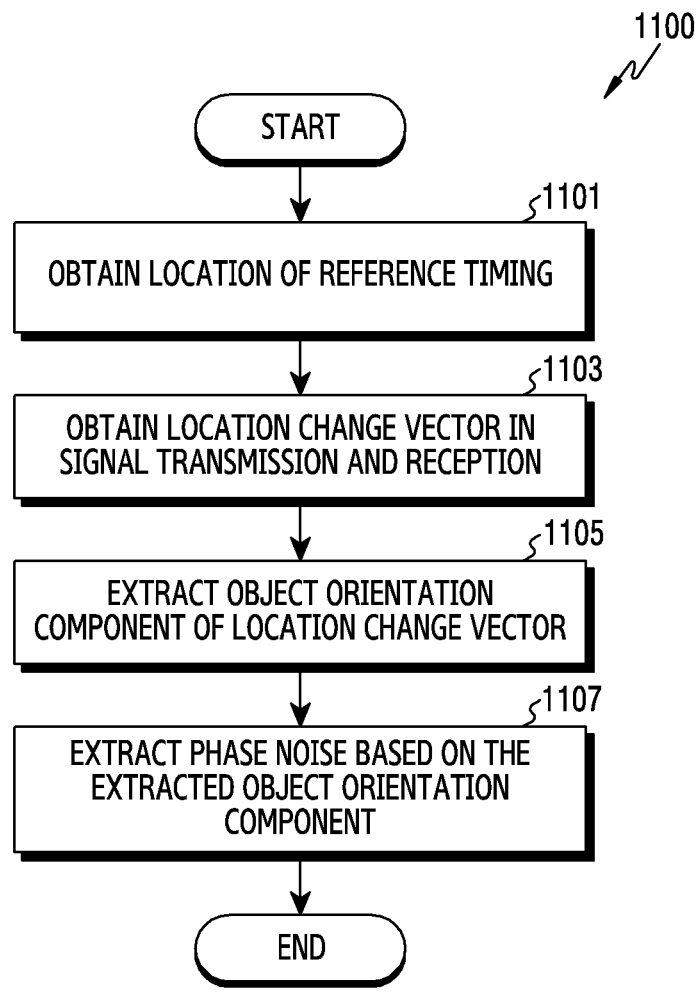
FIG. 11 is a flowchart illustrating phase noise detection based on movement of an electronic device according to an embodiment the disclosure.

FIG. 11 is a flowchart 1100 illustrating phase noise detection based on movement of an electronic device according to an embodiment of the disclosure.

The operating entity of the flowchart 1100 of FIG. 11 may be construed to be an electronic device (e.g., the electronic device 101 of FIG. 1 or the electronic device 601 of FIG. 6), a processor (e.g., the processor 120 of FIG. 1 or the processor 610 of FIG. 6) of the electronic device, or a movement detection module (e.g., the movement detection module 630 of FIG. 6).

Referring to FIG. 11, according to one or more embodiments, in operation 1101, the electronic device 101 or 601 may acquire its location at a reference timing (e.g., the reference time 800 of FIG. 8A). The electronic device 101 or 601 may acquire its location using a module such as a gyro sensor, an acceleration sensor, a 6-axis sensor, a shock sensor, or a GPS sensor. The reference timing may be, but not limited to, a timing (e.g., the reference time 800 of FIG. 8A) at which an initial signal of a radar frame (e.g., the radar frame 710 of FIG. 7) is transmitted, and may be preset arbitrarily.

According to one or more embodiments, in operation 1103, the electronic device 101 or 601 may obtain a relative location change vector with respect to the location of the reference timing in signal transmission for object detection and reflected signal reception. The electronic device 101 or 601 may generate the location change vector by acquiring its location in measurement and extracting a difference from the location of the reference timing, or generate the location change vector by acquiring a vector based on the movement using the gyro sensor. The movement detection module 630 may generate the location change vector of the electronic device 101 or 601 for every request of the processor 610 or the wireless communication module 620 as shown in FIG. 8A, FIG. 8B, and FIG. 8C, or may continuously generate the location change vector according to a preset rule as shown in FIG. 8D, FIG. 8E, and FIG. 8F. According to another embodiment, the location change vector may be generated by the processor 610 which obtains the location information from the movement detection module 630.

According to an embodiment, as shown in FIGS. 8B, 8C, 8E or 8F, the movement detection module 630 or the processor 610 may not acquire the location change vector of particular signal transmission and reception through the measurement. In this case, the movement detection module 630 or the processor 610 may acquire the location change vector of the particular signal transmission and reception using a location change vector acquired before and/or after the particular signal transmission and reception. According to an embodiment, the movement detection module 630 or the processor 610 may acquire the location change vector of the particular signal transmission and reception using interpolation (e.g., linear interpolation) based on the location change vector acquired before and after the particular signal transmission and reception.

According to one or more embodiments, in operation 1105, the electronic device 101 or 601 may extract a component matching an orientation of a recognized object, which is acquired in operation 1007 of FIG. 10, from the location change vector acquired in operation 1103. Phases noise is caused by the component matching the object orientation, and a component perpendicular to the object orientation may not cause the phase noise. Hence, the electronic device 101 or 601 may extract only the component matching the object orientation from the location change vector.

According to one or more embodiments, in operation 1107, the electronic device 101 or 601 may detect the phase noise based on the component of the location change vector matching the object orientation extracted in operation 1105.

According to the flowcharts 1000 and 1100 of FIG. 10 and FIG. 11, the electronic device 101 or 601 may perform the compensation to mitigate the phase noise occurred by the movement. By means of the compensation, the electronic device 101 or 601 may acquire more accurate phase information of the signal reflected from the object. Based on the more accurate phase information, the electronic device 101 or 601 may fulfill an operation requiring high phase accuracy such as face recognition, gesture recognition, live object detection.

According to one or more embodiments, a method for operating an electronic device (e.g., the electronic device 101 of FIG. 1 or the electronic device 601 of FIG. 6) may include transmitting at least one signal to recognize an external object, by controlling a wireless communication module (e.g., the wireless communication module 192 of FIG. 1 or the wireless communication module 620 of FIG. 6), receiving at least one signal transmitted and reflected from the external object, by controlling the wireless communication module, obtaining channel impulse response based on the transmitted signal and the received signal, obtaining orientation information of the external device based on the received signal, detecting phase noise occurred by a movement of the electronic device, extracting a component matching the orientation of the external device from the detected phase noise, and compensating for phase information in the channel impulse response based on the component matching the orientation of the external device.

According to one or more embodiments, obtaining the channel impulse response may include calculating a correlation value of the transmitted signal and the received signal, obtaining a peak timing of the correlation value, and obtaining amplitude and phase information of the received signal.

According to one or more embodiments, receiving the signal may include receiving a signal transmitted and reflected from the external object via each of at least one antenna (e.g., the antenna module 197 of FIG. 1 or the antenna array 211 of FIG. 2A), and obtaining the orientation information of the external device based on the received signal may include obtaining a delay time of the signal received at each of the at least one antenna and obtaining orientation information of the external object based on the delay time of the signal received at each of the at least one antenna.

According to one or more embodiments, detecting the phase noise occurred by the movement of the electronic device may include obtaining first location information of the electronic device at a reference time, obtaining second location information of the electronic device in transmitting the signal and/or receiving the reflected signal, obtaining location change information indicating a difference between the reference time and a location of the signal transmission and/or the reflected signal reception based on the second location information and the first location information, and detecting the phase noise based on the component of the location change information.

According to one or more embodiments, obtaining the location change information may include transmitting a message requesting location information to a movement detection module (e.g., the movement detection module 630 of FIG. 6) and obtaining the location information or the location change information from the movement detection module, in response to the request message.

According to one or more embodiments, obtaining the location change information may include transmitting a message requesting location information to a movement detection module and obtaining the location information or the location change information from the movement detection module at particular time intervals or at time intervals according to a preset pattern, in response to the request message.

According to one or more embodiments, obtaining the location change information may further include obtaining the location change information of the signal transmission and/or the reflected signal reception by compensating for the obtained location change information using interpolation with respect to around view in the signal transmission and/or the reflected signal reception.

According to one or more embodiments, detecting the phase noise based on the extracted component of the location change information matching the orientation of the external object may include extracting a movement distance d of the electronic device toward the external object from the location change information, and detecting the phase noise based on the movement distance d of the electronic device and a wavelength $\lambda$. of an electromagnetic wave carrying the signal, and compensating for the phase information based on the detected phase noise may include compensating for the phase information by subtracting the detected phase noise from the phase information of the obtained impulse response.

According to one or more embodiments, transmitting the at least one signal may include transmitting the at least one signal according to an 802.11ad, 802.11aj or 802.11ay wireless communication scheme, wherein the signal may include a PPDU of the 802.11ad, 802.11aj or 802.11ay, and the PPDU may include a Golay sequence or a Golay complementary sequence to assist in obtaining the channel impulse response.

According to one or more embodiments, the method may further include performing face recognition, gesture recognition, or live object detection based on the compensated phase information.

A method and an electronic device according to one or more embodiments may provide high precision and recognition by mitigating phase noise occurred by a micro movement of a person, or a movement or a vibration occurring in a hostile environment, if a wireless communication device of the electronic device is used for a radar function.

A method and an electronic device according to one or more embodiments may enhance precision and recognition of object recognition, by mitigating phase noise occurred by hand shaking, micro vibration or movement in the object recognition.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a wireless communication module;
    a movement detection module configured to detect a movement of the electronic device;
    at least one processor operatively coupled with the wireless communication module and the movement detection module; and
    at least one memory operatively coupled with the at least one processor,
    wherein the at least one memory stores instructions which, when executed, cause the at least one processor to:
        control the wireless communication module to transmit a signal to an external object,
        control the wireless communication module to receive a signal reflected from the external object,
        obtain a channel impulse response based on the transmitted signal and the received signal,
        obtain information of an orientation of the external object based on the received signal,
        control the movement detection module to detect phase variation caused by a movement of the electronic device,
        extract a component matching the orientation of the external object from the detected phase variation,
        compensate for phase variation in the channel impulse response based on the component matching the orientation of the external object, and
        perform at least one of face recognition, gesture recognition, or live object detection based on the compensated phase variation, and
    wherein the component corresponds to a first component of a location change vector calculated based on the movement of the electronic device.

2. The electronic device of claim 1, wherein the instructions further cause the at least one processor to:
    calculate a correlation value of the transmitted signal and the received signal,
    obtain a peak timing of the correlation value, and
    obtain amplitude and phase variation of the received signal.

3. The electronic device of claim 1, further comprising:
    at least one antenna,
    wherein the instructions further cause the at least one processor to:
        obtain a delay time of a signal received at each of the at least one antenna with respect to the transmitted signal, and
        obtain the information of the orientation of the external object based on the delay time of the signal received at each of the at least one antenna.

4. The electronic device of claim 1, wherein the instructions further cause the at least one processor to:
    by controlling the movement detection module, obtain first location information of the electronic device at a reference time, obtain second location information of the electronic device in transmitting the signal or in receiving the reflected signal, and obtain location change information indicating a difference between the reference time and a location of the signal transmission or of the reflected signal reception based on the second location information and the first location information,
    extract a component matching the orientation of the external object from the location change information, and
    detect the phase variation based on the extracted component of the location change information matching the orientation of the external object.

5. The electronic device of claim 4, wherein the instructions further cause the at least one processor to:
    transmit a message, requesting location information, to the movement detection module, and
    obtain the location information or the location change information from the movement detection module, in response to the request message.

6. The electronic device of claim 4, wherein the instructions further cause the at least one processor to:
    transmit a message, requesting location information, to the movement detection module, and
    obtain the location information or the location change information from the movement detection module at particular time intervals or at time intervals according to a preset pattern, in response to the request message.

7. The electronic device of claim 4, wherein the instructions further cause the at least one processor to:
    extract a movement distance d of the electronic device toward the external object from the location change information as the component matching the orientation of an external device in the location change information,
    detect the phase variation based on the movement distance d and a wavelength λ of an electromagnetic wave carrying the signal, and
    compensate for the phase variation by subtracting the detected phase variation from the phase variation of the obtained channel impulse response.

8. The electronic device of claim 1,
    wherein the wireless communication module is operated according to at least one of an 802.11ad, 802.11aj, or 802.11ay wireless communication scheme,
    wherein the transmitted signal and the received signal comprise a physical layer protocol data unit (PPDU) of IEEE 802.11ad, IEEE 802.11aj or IEEE 802.11ay respectively, and wherein the PPDU comprises a Golay sequence or a Golay complementary sequence to assist in obtaining the channel impulse response.

9. An electronic device comprising:
a wireless communication module;
a movement detection module configured to detect a movement of the electronic device; and
at least one processor operatively coupled with the wireless communication module and the movement detection module,
wherein the wireless communication module is configured to:
transmit at least one signal to recognize an external object,
receive at least one signal transmitted and reflected from the external object,
obtain a channel impulse response based on the transmitted signal and the received signal,
obtain information of an orientation of the external object based on the received signal,
receive a detected phase variation cased by a movement of the electronic device from the movement detection module,
extract a component matching the orientation of the external object from the detected phase variation,
compensate for phase variation in the channel impulse response based on the component matching the orientation of the external object, and
perform at least one of face recognition, gesture recognition, or live object detection based on the compensated phase variation,
wherein the component corresponds to a first component of a location change vector calculated based on the movement of the electronic device, and
wherein the movement detection module is configured to:
obtain first location information of the electronic device at a reference time, second location information of the electronic device in transmitting the at least one signal or in receiving the reflected signal, and location change information indicating a difference between the reference time and a location of the at least one signal transmission or of the reflected signal reception based on the second location information and the first location information,
extract a component matching the orientation of the external object from the location change information, and
detect the phase variation based on the extracted component of the location change information matching the orientation of the external object.

10. A method for operating an electronic device, the method comprising:
controlling a wireless communication module to transmit a signal to an external object;
controlling the wireless communication module to receive at least one signal reflected from the external object;
obtaining channel impulse response based on the transmitted signal and the received signal;
obtaining information of an orientation of the external object based on the received signal;
detecting phase variation caused by a movement of the electronic device;
extracting a component matching the orientation of the external object from the detected phase variation;
compensating for phase variation in the channel impulse response based on the component matching the orientation of the external object; and
performing at least one of face recognition, gesture recognition, or live object detection based on the compensated phase variation,
wherein the component corresponds to a first component of a location change vector calculated based on the movement of the electronic device.

11. The method of claim 10, wherein obtaining the channel impulse response comprises:
calculating a correlation value of the transmitted signal and the received signal;
obtaining a peak timing of the correlation value; and
obtaining amplitude and phase variation of the received signal.

12. The method of claim 10, wherein receiving the signal comprises:
receiving a signal reflected from the external object via each of at least one antenna; and
obtaining the information of the orientation of the external object based on the received signal by obtaining a delay time of the signal received at each of the at least one antenna and obtaining the information of the orientation of the external object based on the delay time of the signal received at each of the at least one antenna.

13. The method of claim 10, wherein the detecting of the phase variation caused by the movement of the electronic device comprises:
obtaining first location information of the electronic device at a reference time;
obtaining second location information of the electronic device in transmitting the signal or in receiving the reflected signal;
obtaining location change information indicating a difference between the reference time and a location of the signal transmission or of the reflected signal reception based on the second location information and the first location information; and
detecting the phase variation based on the component of the location change information.

14. The method of claim 13, wherein obtaining the location change information comprises:
transmitting a message, requesting location information, to a movement detection module; and
obtaining the location information or the location change information from the movement detection module, in response to the request message.

15. The method of claim 13, wherein obtaining the location change information comprises:
transmitting a message, requesting location information, to a movement detection module; and
obtaining the location information or the location change information from the movement detection module at particular time intervals or at time intervals according to a preset pattern, in response to the message.

16. The method of claim 15, wherein obtaining the location change information further comprises:
obtaining the location change information of the signal transmission or of the reflected signal reception by compensating for the obtained location change information using interpolation with respect to around view in the signal transmission or in the reflected signal reception.

17. The method of claim 13,
wherein detecting the phase variation based on the extracted component of the location change information matching the orientation of the external object comprises:

extracting a movement distance of the electronic device toward the external object from the location change information, and detecting the phase variation based on the movement distance of the electronic device and a wavelength of an electromagnetic wave carrying the signal, and wherein compensating for the phase variation based on the detected phase variation comprises:

compensating for the phase variation by subtracting the detected phase variation from the phase variation of the obtained channel impulse response.

18. The method of claim 10, wherein transmitting the at least one signal comprises:

transmitting the signal according to at least one of an 802.11ad, 802.11aj, or 802.11ay wireless communication scheme, wherein the signal comprises a physical layer protocol data unit (PPDU) of the 802.11ad, 802.11aj or 802.11ay, and wherein the PPDU comprises a Golay sequence or a Golay complementary sequence to assist in obtaining the channel impulse response.

19. The method of claim 10, further comprising:

performing at least one of face recognition, gesture recognition, or live object detection based on the compensated phase variation.

* * * * *